United States Patent
Hosseini et al.

(10) Patent No.: US 11,229,047 B2
(45) Date of Patent: Jan. 18, 2022

(54) TRANSPORT BLOCK REPETITION HANDLING FOR DOWNLINK AND UPLINK TRANSMISSIONS

(71) Applicant: QUALCOMM Incorporated, San Diego, CA (US)

(72) Inventors: Seyedkianoush Hosseini, San Diego, CA (US); Wanshi Chen, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 28 days.

(21) Appl. No.: 16/375,842

(22) Filed: Apr. 4, 2019

(65) Prior Publication Data

US 2019/0313442 A1 Oct. 10, 2019

Related U.S. Application Data

(60) Provisional application No. 62/654,297, filed on Apr. 6, 2018.

(51) Int. Cl.
*H04W 72/14* (2009.01)
*H04W 72/04* (2009.01)

(52) U.S. Cl.
CPC ....... *H04W 72/14* (2013.01); *H04W 72/0473* (2013.01)

(58) Field of Classification Search
None
See application file for complete search history.

(56) References Cited

U.S. PATENT DOCUMENTS 9,461,797 B2 * 10/2016 Ahn ................. H04L 5/005
2014/0269355 A1 * 9/2014 Monogioudis ...... H04W 52/244
370/252

(Continued)

FOREIGN PATENT DOCUMENTS

KR 20190027426 A * 3/2019

OTHER PUBLICATIONS

U.S. Appl. No. 62/571,167. Choi. Apparatus and Method of Frequency Hopping for SRS Resource in NR. Corresponding to priority support for KIM—U.S. Pat. No. 20150304149 (Year: 2017).*

(Continued)

*Primary Examiner* — Andre Tacdiran
(74) *Attorney, Agent, or Firm* — Holland & Hart LLP

(57) ABSTRACT

Methods, systems, and devices for wireless communications are described. In some systems, devices may implement transmission repetitions for transport blocks (TBs) to improve reception reliability. To support low latency, TBs may be transmitted in any transmission time interval (TTI) or mini-slot within a subframe or slot. The systems may implement processes to handle these TB repetitions near slot or subframe boundaries. For example, different resources in time for an initial TB transmission may correspond to different numbers of repetitions to avoid crossing defined boundaries. In some cases, TB transmission parameters, numbers of repetitions, or both may be modified based on a repetition window spanning multiple slots or subframes. A base station may transmit a grant indicating the initial resource in time, and a user equipment (UE) may determine the number of transmission repetitions for a TB based on a proximity of the initial resource in time to a defined boundary.

30 Claims, 19 Drawing Sheets

(56) References Cited

U.S. PATENT DOCUMENTS

| | | | |
|---|---|---|---|
| 2014/0269457 A1* | 9/2014 | Folke | H04W 72/1226 370/280 |
| 2015/0029890 A1* | 1/2015 | Siomina | H04L 1/1887 370/252 |
| 2015/0057011 A1* | 2/2015 | Di Girolamo | H04W 16/14 455/454 |
| 2015/0304149 A1* | 10/2015 | Kim | H04J 11/00 375/260 |
| 2016/0066288 A1* | 3/2016 | Feng | H04W 52/54 370/280 |
| 2016/0127098 A1* | 5/2016 | Ng | H04L 5/0048 370/329 |
| 2017/0048051 A1* | 2/2017 | Siomina | H04L 1/1825 |
| 2017/0273113 A1* | 9/2017 | Tirronen | H04W 72/042 |
| 2017/0332321 A1* | 11/2017 | Zhang | H04L 5/0035 |
| 2018/0198677 A1* | 7/2018 | Blankenship | H04L 5/0053 |
| 2018/0368174 A1* | 12/2018 | Jeon | H04W 72/044 |
| 2019/0020455 A1* | 1/2019 | Yamamoto | H04L 1/1861 |
| 2019/0075503 A1* | 3/2019 | Bae | H04W 52/367 |
| 2019/0150142 A1* | 5/2019 | Huang | H04L 5/0094 370/336 |
| 2019/0174327 A1* | 6/2019 | You | H04W 4/70 |
| 2019/0182807 A1* | 6/2019 | Panteleev | H04L 1/1819 |
| 2019/0313436 A1* | 10/2019 | Lee | H04W 72/042 |
| 2020/0059322 A1* | 2/2020 | Lei | H04L 1/18 |
| 2020/0092858 A1* | 3/2020 | Ye | H04L 1/1861 |
| 2020/0177326 A1* | 6/2020 | Jechoux | H04W 72/042 |
| 2021/0014005 A1* | 1/2021 | Ying | H04L 1/1896 |

OTHER PUBLICATIONS

Ericsson: "Further LTE Physical Layer Enhancements for MTC", 3GPP Draft; RP-151186 Status Report for Further LTE Physical Layer Enhancements for MTC, 3rd Generation Partnership Project (3GPP), Mobile Competence Centre; 650, Route Des Lucioles; F-06921 Sophia-Antipolis, vol. TAG RAN, No. Phoenix, USA; Sep. 14, 2015-Sep. 16, 2015, Sep. 8, 2015, XP051653055, 20 Pages, Retrieved from the Internet: URL: http://www.3gpp.org/ftp/tsg%5Fran/tsg%5FRAN/TSGR%5F69/Docs/RP%2D151186%2Ezip [retrieved on Sep. 8, 2015] p. 2.

Huawei et al.: "Resource Allocation and TBS," 3GPP Draft; R1-1719381, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Nov. 18, 2017, XP051369290, 16 pages, Retrieved from the Internet: URL: http://www.3gpp.org/ftp/tsg%5Fran/WG1%5FRL1/TSGR1%5F91/Docs/ [retrieved on Nov. 18, 2017] section 4; p. 11.

International Search Report and Written Opinion—PCT/US2019/026103—ISA/EPO—dated Jun. 28, 2019.

NTT DOCOMO et al: "DMRS for PUSCH in Partial Subframe Transmission," 3GPP Draft; R1-1708425_DMRS for PUSCH in Partial Subframe Transmission_Final, 3rd Generation Partnership Project (3GPP), Mobile Competence Centre; 650, Route Des Lucioles; F-06921 Sophia-Antipolis Cedex; vol. RAN WG1, No. Hangzhou; May 15, 2017-May 19, 2017, May 6, 2017, XP051262442, 4 Pages, Retrieved from the Internet: URL: http://www.3gpp.org/ftp/tsg_ran/WG1_RL1/TSGR1_89/Docs/ [retrieved on May 6, 2017] section 2.2 "Scheme 3-1".

NTT DOCOMO et al: "UL Data Transmission Procedures," 3GPP Draft; R1-1718219, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017, Oct. 8, 2017, XP051341401, 12 pages, Retrieved from the Internet: URL: http://www.3gpp.org/ftp/Meetings_3GPP.org/ftp/Meetings_3GPP__SYNC/RAN1/Docs/ [retrieved on Oct. 8, 2017] section 4; p. 8 section 6.2; p. 9.

NTT DOCOMO: "Remaining Issues for 7.1.3.3.4", 3GPP Draft; R1-1803390, 3rd Generation Partnership Project (3GPP), Mobile Competence Centre; 650, Route Des Lucioles ; F-06921 Sophia-Antipolis Cedex; France, vol. RAN WG1, No. Athens, Greece; Feb. 26, 2018-Mar. 2, 2018, Mar. 1, 2018, XP051398619, 17 Slides, Retrieved from the Internet: URL: http://www.3gpp.org/ftp%5Fran/WG1%5FRL1/TSGR1%5F92/Docs/ [retrieved on Mar. 1, 2018] slide 12.

SAMSUNG: "Prioritizations of Overlapped UL Transmissions," 3GPP Draft; R1-160542 EMTC UL Prioritization, 3rd Generation Partnership Project (3GPP), Mobile Competence Centre; 650, Route Des Lucioles; F-06921 Sophia-Antipolis Cedex; France, vol. RAN WG1, No. St Julians, Malta; Feb. 15, 2016-Feb. 19, 2016, Feb. 5, 2016, XP051064021, 4 Pages, Retrieved from the Internet: URL: http://www.3gpp.org/ftp/tsg_ran/WG1_RL1/TSGR1_84/Docs/ [retrieved on Feb. 5, 2016] section 2; p. 1.

* cited by examiner

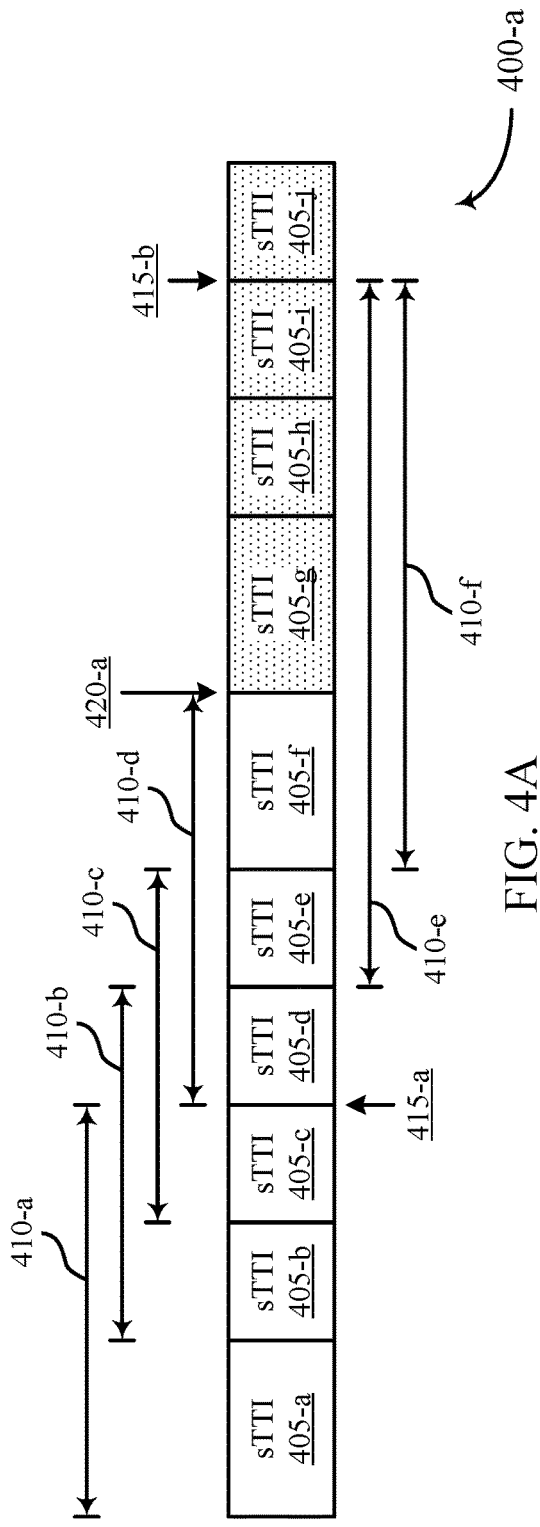
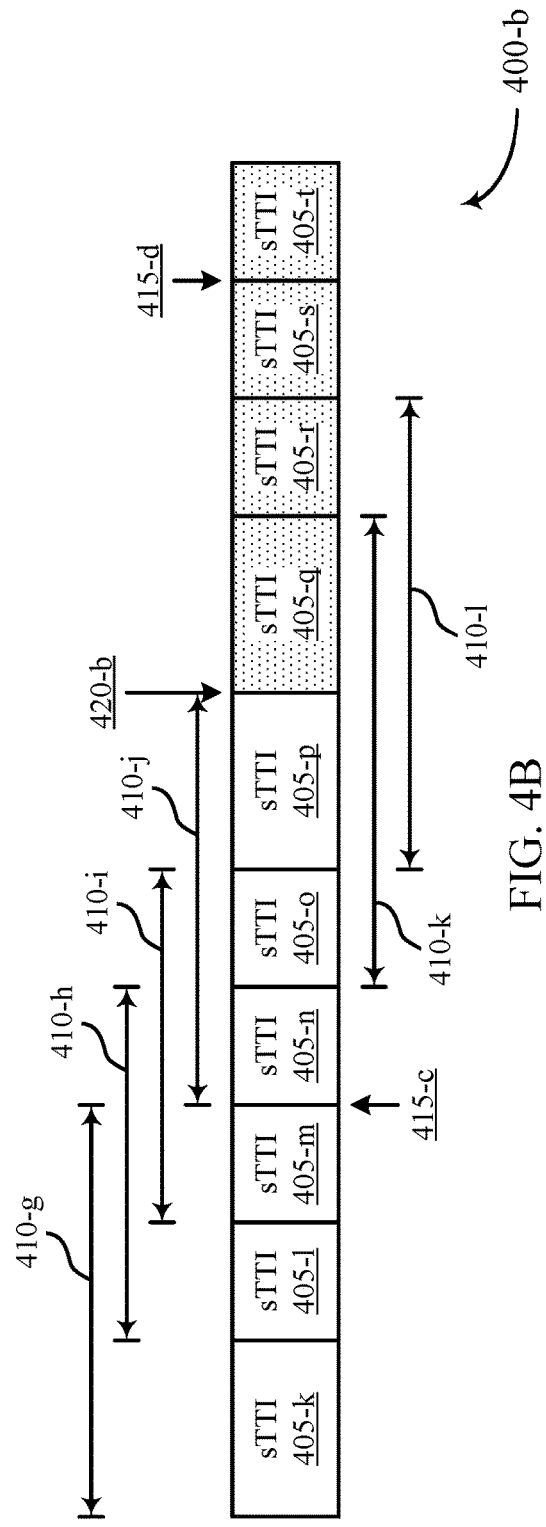
FIG. 4A
FIG. 4B

TRANSPORT BLOCK REPETITION HANDLING FOR DOWNLINK AND UPLINK TRANSMISSIONS

CROSS REFERENCES

The present application for patent claims the benefit of U.S. Provisional Patent Application No. 62/654,297 by Hosseini, et al., entitled "Transport Block Repetition Handling for Downlink and Uplink Transmissions," filed Apr. 6, 2018, assigned to the assignee hereof, and expressly incorporated by reference in its entirety herein.

BACKGROUND

The following relates generally to wireless communications, and more specifically to transport block (TB) repetition handling for downlink and uplink transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, wireless devices may utilize repeated transmissions of a same TB to meet certain reliability standards.

SUMMARY

The described techniques relate to improved methods, systems, devices, or apparatuses that support transport block (TB) repetition handling for downlink and uplink transmissions. Generally, the described techniques provide for wireless devices to perform multiple transmissions, which may be referred to as repetitions, of a same TB to meet certain reliability standards or thresholds. In low latency systems, TBs may be transmitted in any transmission time interval (TTI), mini-slot, or symbol within a slot, mini-slot, or subframe (e.g., based on when a packet becomes ready for transmission). The systems may implement processes to handle these TB repetitions near slot or subframe boundaries. For example, in some cases, the number of transmission repetitions for a TB may be based on the proximity of an initial symbol or set of symbols (e.g., orthogonal frequency-division multiplexing (OFDM) symbols used for the initial transmission of the TB) to a slot boundary. In other cases, the TB transmission parameters or number of repetitions may be modified based on a repetition window spanning more than one slot or subframe. A base station may transmit a grant indicating the initial TTI index (or, in some systems, the initial symbol or initial mini-slot) for the TB transmission (e.g., in control information) to a user equipment (UE), and the UE may determine the number of transmission repetitions for the TB based on a proximity between the indicated time resources and a slot boundary, or an explicit indication in the grant. The base station and UE may use the initial TTI index (or, similarly, the indication of the initial symbol or mini-slot for transmission) and the determined number of repetitions to identify a repetition window for transmitting the TB repetition transmissions and for monitoring the channel for the transmission repetitions.

BRIEF DESCRIPTION OF THE DRAWINGS

FIGS. 3A, 3B, 4A and 4B illustrate examples of subframe or slot configurations that support TB repetition handling for downlink and uplink transmissions in accordance with aspects of the present disclosure.

DETAILED DESCRIPTION

In some cases, a user equipment (UE) may transmit or receive multiple transmissions, also referred to as repetitions, of a transport block (TB), to ensure compliance with a reliability standard. When low latency is a priority, these repetitions may be transmitted without relying on a hybrid automatic repeat request (HARQ) triggering mechanism, thereby allowing the same TB to be transmitted multiple times over multiple transmission time intervals (TTIs) (e.g., resources in time). Depending on the number of repetitions transmitted and a time resource (e.g., the TTI, initial symbol, mini-slot, etc.) at which the first repetition is transmitted, two or more repetitions of the TB may be transmitted in different slots or subframes, which may reduce the coherency between the repetitions and degrade the quality of the TB reception.

This disclosure provides techniques for managing the transmission and reception of multiple repetitions of a TB by making the number of repetitions of the TB dependent on the initial symbol, mini-slot, or TTI index for an initial transmission of the TB. In this way, a UE can receive control information including a grant that explicitly or implicitly indicates the initial symbol, mini-slot, or TTI index for the initial transmission of the TB, determine a number of transmission repetitions of the TB based on the initial symbol, mini-slot, or TTI index (e.g., based on a proximity in time between the initial transmission and a slot boundary), and transmit or receive the transmission repetitions of the TB based on the determined number of transmission repetitions. As explained herein, these techniques may result in improved multiplexing capacity, repetition coherency, and power control of the transmitted TB.

Aspects of the disclosure are initially described in the context of wireless communications systems. Additional aspects of the disclosure are described with reference to example subframe configurations and process flows. Aspects of the disclosure are further illustrated by and described with reference to apparatus diagrams, system diagrams, and flowcharts that relate to TB repetition handling for downlink and uplink transmissions.

Figure 1:
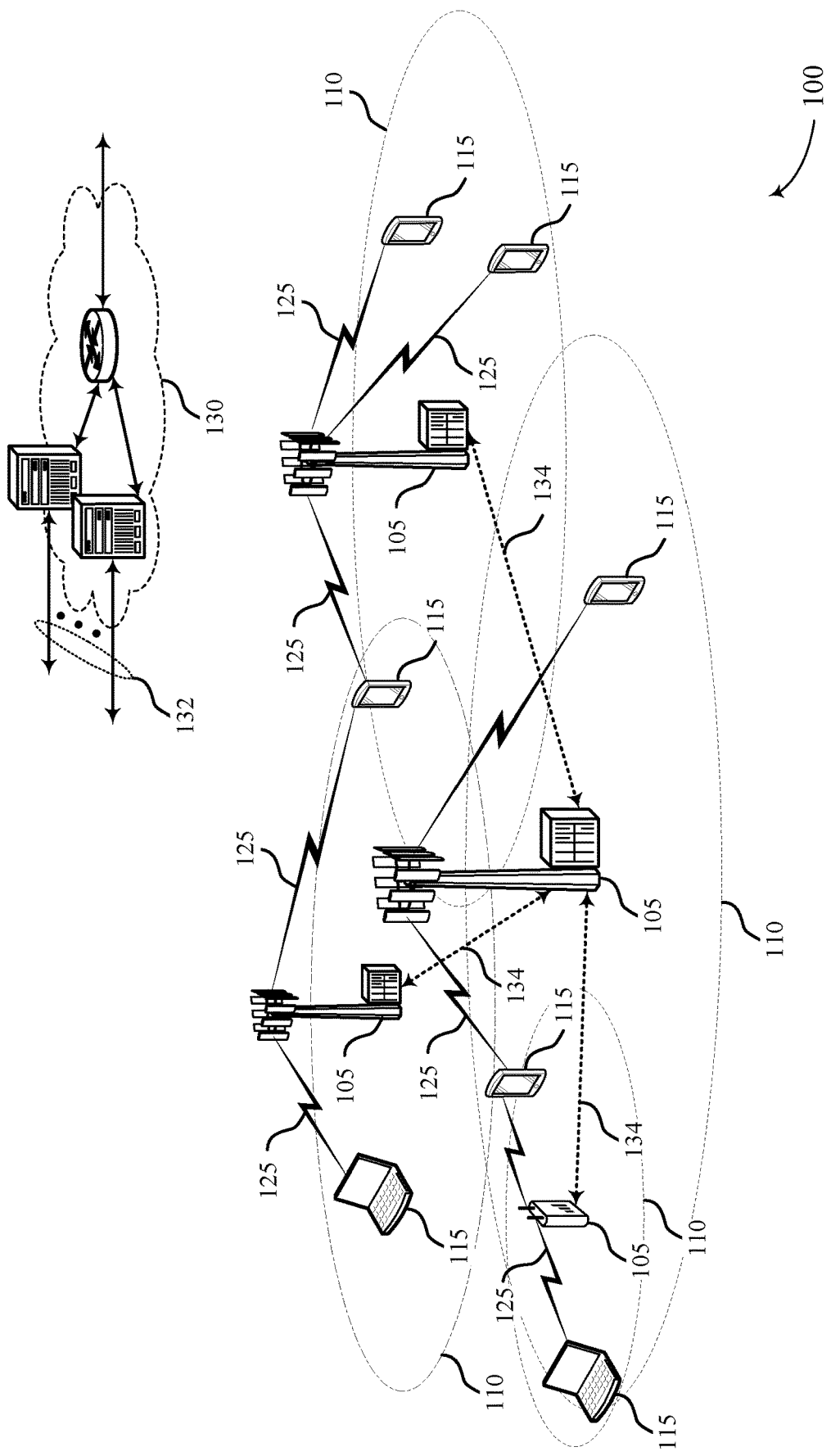
FIGS. 1 and 2 illustrate examples of wireless communications systems that support transport block (TB) repetition handling for downlink and uplink transmissions in accordance with aspects of the present disclosure.

FIG. 1 illustrates an example of a wireless communications system 100 that supports TB repetition handling for downlink and uplink transmissions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or another interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality.

Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (ms), where the frame period may be expressed as $T_f$=307,200 Ts. The radio frames may be identified by a system frame number (SFN) ranging from 0 to 1023. Each frame may include 10 subframes numbered from 0 to 9, and each subframe may have a duration of 1 ms. In some examples, a subframe may be further divided into 2 slots each having a duration of 0.5 ms, and each slot may contain 6 or 7 modulation symbol periods (e.g., depending on the length of the cyclic prefix prepended to each symbol period). In other examples, a subframe may be divided into a variable number of slots (e.g., a subframe with a different subcarrier spacing (SCS) may be divided into a different number of slots), and each slot may contain 7 or 14 modulation symbol periods. Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the SCS or frequency band of operation, for example. In some cases, a mini-slot may start or end at any symbol index within a slot. For example, a slot containing 14 orthogonal frequency-division multiplexing (OFDM) symbols may include any number of mini-slots starting at any symbol indices, where the mini-slots may define the units for scheduling transmissions (e.g., sometimes referred to as TTIs or sTTIs in other systems). Some wireless communications systems may implement slot aggregation in which multiple slots or mini-slots are aggregated together and used for communication between a UE 115 and a base station 105.

In some examples of the systems described herein, certain terms may be used interchangeably for different types of wireless communications systems. For example, a TTI in an LTE system may refer to a mini-slot or symbol (such as an OFDM symbol) in an NR system. Additionally, in some examples, a TTI index (e.g., in an LTE system) may refer to a symbol, symbol index, mini-slot, or mini-slot index in other systems (e.g., in an NR system). For example, the TTI index may correspond to an initial symbol for TB transmission, where this TB transmission may occur in a scheduled TTI or mini-slot. Similarly, a subframe (e.g., in an LTE system) may correspond to a slot in other systems (e.g., in an NR system). While any combination of these terms may be used herein, it is to be understood that equivalent or similar terms may be used interchangeably and may apply to any type of wireless communications system.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and SCS are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and SCS may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some wireless communications systems 100, wireless devices may implement transmission repetitions of a same TB to meet certain reliability standards or thresholds. For example, in ultra-reliable low latency communications (URLLC) systems, TBs may be transmitted in any TTI or mini-slot within a subframe or slot (e.g., based on when a packet becomes ready for transmission). Base stations 105 and UEs 115 may implement processes to handle these TB repetitions near slot or subframe boundaries. For example, in some cases, the number of transmission repetitions for a TB may be based on a TTI index of a TTI or an initial symbol (e.g., the OFDM symbol used for the initial transmission of the TB) of a mini-slot. The number of repetitions corresponding to a TB may be based on the proximity of the initial transmission of the TB to slot or subframe boundaries. In other cases, reliability may be improved by allowing a repetition window to span across multiple slots or subframes. A repetition window may refer to a time period spanning one or more symbols, mini-slots, or TTIs in which a same TB is repeated. As each TTI or mini-slot may contain a single TB transmission, a larger number of transmission repetitions may correspond to a longer repetition window (e.g., where the number of TTIs or mini-slots in the repetition window may equal the number of TB transmission repetitions). In these cases, the base stations 105 and UEs 115 may modify transmission parameters or the window size to mitigate the effects of using different slots or subframes for repeated transmissions. A base station 105 may transmit a grant indicating the initial time resources (e.g., based on a TTI index, an initial OFDM symbol of a TTI or mini-slot, etc.) for the TB transmission (e.g., in control information) to a UE 115, and the UE 115 may determine the number of transmission repetitions for the TB based on the proximity of the indicated time resources to a slot or subframe boundary, or an explicit indication in the grant. In the downlink, the base station 105 may use the TTI index (or indicated mini-slot) and the determined number of repetitions to identify a repetition window for transmitting the TB repetition transmissions, and the UE 115 may use the TTI index (or indicated mini-slot) and the determined number of repetitions to determine a window for monitoring the channel. In the uplink, the UE 115 may transmit the multiple transmissions of the TB in the repetition window, and the base station 105 may monitor for and receive the transmissions in the window.

Figure 2:
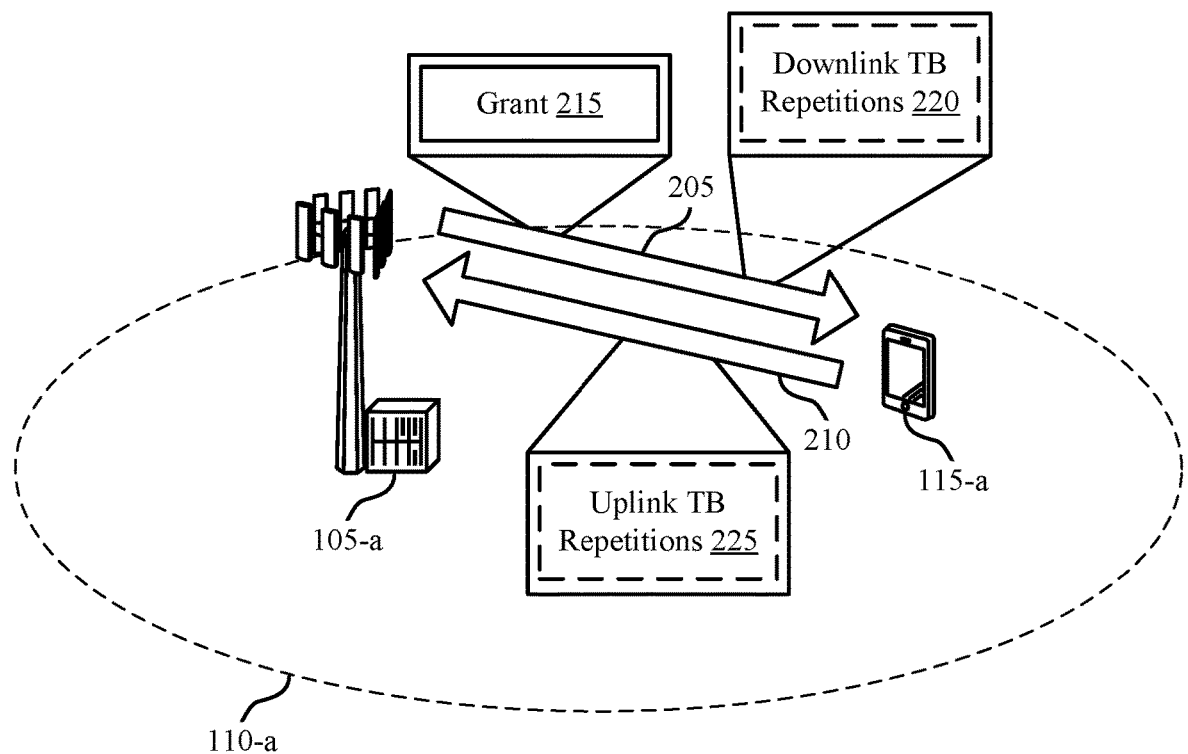

FIG. 2 illustrates an example of a wireless communications system 200 that supports TB repetition handling for downlink and uplink transmissions in accordance with aspects of the present disclosure. The wireless communications system 200 (e.g., an LTE URLLC system, an NR URLLC system, etc.) may include base station 105-a and UE 115-a, which may be examples of the corresponding devices described with respect to FIG. 1. Base station 105-a may provide service for geographic area 110-a as described with respect to FIG. 1. Base station 105-a may transmit messages and signals on the downlink 205 to UE 115-a, and may receive messages and signals from UE 115-a on the uplink 225. In some cases, the wireless communications system 200 may support certain reliability metrics or requirements. For some systems (e.g., systems with a SCS of 15 kilohertz (kHz)), base stations 105 and UEs 115 may implement repetition-based transmission of a same TB for improved reliability.

In TB repetition, a wireless device (e.g., base station 105-a, UE 115-a, or both) may transmit the same TB multiple times over multiple TTIs. In some cases, these TTIs may be referred to as shortened TTIs (sTTIs) or mini-slots and may span any length of time (e.g., one symbol, two symbols, three symbols, etc.). In some cases, for reduced latency, the wireless device may transmit a TB as soon as a packet is generated and ready for transmission in the TB. In these cases, the device may transmit a TB in any TTI or mini-slot within a subframe or slot that supports data transmission (e.g., any subframe other than a control subframe in the downlink 205 or any subframe in the uplink 210). Depending on the TTI or mini-slot used for the initial TB transmission, transmitting a certain number of repetitions of the TB may result in the transmission repetitions crossing a defined boundary (e.g., a slot or subframe boundary). Different repetitions of the same transmission crossing such a boundary may result in complex multiplexing for longer channels or discrepancies in transmit power control (TPC) parameters for different repetitions of the TB (e.g., in uplink 210 scenarios utilizing semi persistent scheduling (SPS)). Such discrepancies may cause a loss of coherency between the repetitions.

The wireless communications system 200 may implement transmission repetition configurations for TBs that avoid crossing subframe or slot boundaries, or that manage repeated transmissions that do cross these boundaries to handle these potential issues. For example, to improve the multiplexing capacity, a repetition factor K may depend on the TTI index or initial symbol of the first TB transmission. That is, for transmission repetitions of a same TB, base station 105-a may schedule the TB to be transmitted in a specific TTI corresponding to a TTI index or a specific mini-slot corresponding to an initial OFDM symbol of the mini-slot. The number of repetitions of this TB to transmit (i.e., the repetition factor, K) may be based on this TTI index or this initial symbol for the mini-slot (e.g., based on a proximity of the initial TB transmission to a subframe or slot boundary). In some cases, the repetition factor K that corresponds to a TTI may depend on slot boundaries or subframe boundaries. For example, to avoid transmission repetitions crossing a subframe boundary, a TTI index indicating a TTI close to a subframe boundary for a subsequent subframe may correspond to a lower repetition factor than a TTI index indicating a TTI farther from the subframe boundary for the subsequent subframe. The repetition factors may or may not depend on slot boundaries within a subframe. Similarly, for some systems (e.g., NR URLLC systems), to avoid transmission repetitions crossing a slot boundary, an initial symbol indicating a mini-slot close to a slot boundary for a subsequent slot may correspond to a lower repetition factor than an initial symbol indicating a mini-slot farther from the slot boundary. That is, based on the resource(s) in time corresponding to an initial mini-slot allocated for an initial TB, the number of TB repetitions for this initial TB may be determined based on the remaining OFDM symbols in the slot that follow the initial mini-slot. Additionally, the number of repetitions may be based on the length of each of these mini-slots (e.g., five remaining OFDM symbols in the slot may support two repetitions of the initial TB for mini-slots spanning two symbols, one repetition for mini-slots spanning three symbols, etc.).

Base station 105-a may transmit a grant 215 to UE 115-a, where the grant 215 indicates the time resource allocation for the initial TB transmission. In some cases, this indication may be an explicit indication (e.g., a TTI or sTTI value indicator, a symbol or mini-slot indicator, etc.) or an implicit indication (e.g., based on the timing of the grant 215, resources used for the grant 215, etc.). This grant 215 may be transmitted in control information, an SPS configuration message, RRC signaling (e.g., in an RRC indication), or some combination of these. In some examples, the grant 215 may be an example of a dynamic grant, an SPS grant, or a persistent scheduling grant. The grant may be for uplink or downlink resources. In some cases, the grant 215 may include an explicit indication of the number of transmission repetitions for the TB corresponding to the initial time resource(s) for transmission. In other cases, UE 115-a may determine the number of transmission repetitions based on the received indication of the time resource(s). UE 115-a may determine a repetition window based on the TTI or mini-slot and the number of transmission repetitions. For example, because each repetition of the TB may be transmitted in a separate TTI or mini-slot, the repetition window may span a number of TTIs or mini-slots equal to the number of transmission repetitions (and, correspondingly, equal to the value of the repetition factor), and may start with the TTI corresponding to the TTI index for the initial TB transmission or the mini-slot corresponding to the initial symbol for the initial TB transmission. In some cases, each repeated transmission of the TB in the repetition window may have a dedicated physical downlink control channel (PDDCH) grant. In other cases, a single PDDCH grant may support an entire repetition window, or a portion of the repetition window within one subframe or slot. In some cases, base station 105-a may schedule an additional set of transmissions for the TB if the number of transmission repetitions is below some repetition threshold (e.g., to improve reliability).

For downlink TB transmissions, base station 105-a may transmit a number of downlink TB repetitions 220 in the repetition window according to the determined repetition factor, K. The UE 115-a may monitor for the downlink TB repetitions 220 in the determined repetition window. In some cases, UE 115-a may receive one or more of the downlink TB repetitions 220, and may determine the TB based on the received transmission.

For grant-based uplink TB transmissions, similar processes may be performed as described above for the downlink. Additionally, in some cases, UE 115-a may perform transmit power control TPC handling to support coherent reception. For example, UE 115-a may maintain TPC parameters across a repetition window. UE 115-a may transmit the initial TB transmission according to a first set of TPC parameters. In some cases, UE 115-a may receive a TPC command indicating different TPC parameters for a later TTI, mini-slot, or set of symbols within the repetition window, or downlink control information (DCI) may indicate different TPC parameters for different TTIs, mini-slots, or sets of symbols in the repetition window. In these cases, UE 115-a may ignore the new TPC parameters, and may maintain the TPC parameters used for the initial TB transmission for the rest of the TB transmission repetitions in the repetition window.

Additionally or alternatively, UE 115-a may perform power boosting to improve transmission reliability. For example, UE 115-a may determine a number of transmission repetitions (e.g., based on the initial TTI index or initial mini-slot) that is below a certain threshold number of repetitions. In these cases, UE 115-a may perform power boosting to the TB transmission repetitions available to improve reliability (e.g., in some cases, to meet or exceed the reliability corresponding to a certain number of transmission repetitions). Power boosting may involve increasing transmit power to one or more TTIs, mini-slots, OFDM symbols, or repetition windows for transmission of the TB. That is, for TB repetitions, the power for transmitting each repetition may be boosted by a same amount or may be boosted by different amounts (e.g., based on the length of the TTI or mini-slot for transmitting the TB, based on splitting or shortening of the TTI or mini-slot, etc.). For example, if one or more TB repetitions are transmitted in TTIs or mini-slots with shorter lengths in time than the TTIs or mini-slots for the other TB repetitions, UE 115-a may perform power boosting (or additional power boosting) on the TB repetitions in the shorter TTIs or mini-slots. UE 115-a may additionally or alternatively implement power boosting across a slot or subframe boundary (e.g., using the same or different power boosting values on either side of the boundary). UE 115-a may repeat the power boosted transmission of the TB across resource blocks. In some examples, UE 115-a may utilize multiple repetition number thresholds, and multiple power boosting steps. For example, UE 115-a may perform different levels of power boosting for TBs with one transmission repetition and for TBs with two transmission repetitions (e.g., to meet a same reliability threshold with different numbers of repeat transmissions). The power boosting may be based on the TTI index of the initial TB transmission, the proximity in time of the time resources used for the initial TB transmission to a slot or subframe boundary, or a function of how many fewer repetitions are available than a maximum number of transmission repetitions, $K_{max}$. In some cases, base station 105-a may transmit an indication of the power boosting values to use. In other cases, UE 115-a may implicitly determine the power boosting based on the TTI index or mini-slot indicated by the grant 215 or based on the determined number of transmissions.

Additionally or alternatively, UE 115-a may utilize repetition windows that cross subframe or slot boundaries. For example, if power boosting is not implemented (e.g., due to power capabilities of the UE 115), UE 115-a may increase the transmission reliability by allowing repetition windows to span across more than one subframe or slot, increasing the number of transmission repetitions of the TB. In some cases, TPC changes may be applied for different subframes or slots. In these cases, coherent reception of repetitions across subframe or slot boundaries may not be possible. To improve the reception reliability, UE 115-a may transmit reference signals (e.g., demodulation reference signals (DMRSs)) on either side of the subframe or slot boundary if a repetition window spans the subframe or slot boundary. Base station 105-a may utilize these DMRSs to receive the TB transmissions. In some cases, UE 115-a may receive configuration information (e.g., via RRC signaling) indicating whether to use power boosting or whether the repetition window is permitted to span the subframe or slot boundary.

In some cases, if a repetition window crosses a subframe or slot boundary and UE 115-a is due to transmit a sounding reference signal (SRS), UE 115-a may refrain from transmitting the SRS. Additionally or alternatively, if SPS TPC is scheduled to be applied at the start of this second subframe or slot, UE 115-a may defer applying this SPS TPC until a later time. For example, UE 115-a may defer applying the SPS TPC until the end of the repetition window, the start of the next repetition window, or the start of the next subframe or slot.

UE 115-a may use any combination of these techniques for determining a repetition window for TB uplink transmission, and may transmit uplink TB repetitions 225 in the determined repetition window. Base station 105-a may monitor this same repetition window for the uplink TB repetitions 225, and may receive the TB based on receiving one or more of the uplink TB repetitions 225. While the above processes are described for the uplink case, it is to be understood that similar procedures may be implemented for the downlink.

In some cases, the link direction may determine whether the repetition window size is dynamic or semi-static. For example, for downlink TB repetitions 220, base station 105-a may dynamically indicate the K values for repetition windows corresponding to TTIs, symbols, or mini-slots, as downlink frequency resources can be adjusted to compensate for any time domain loss associated with this dynamic indication. For uplink TB repetitions 225, the uplink K values for repetition windows corresponding to TTIs, symbols, or mini-slots may be semi-statically configured (e.g., using RRC).

Figure 3A:
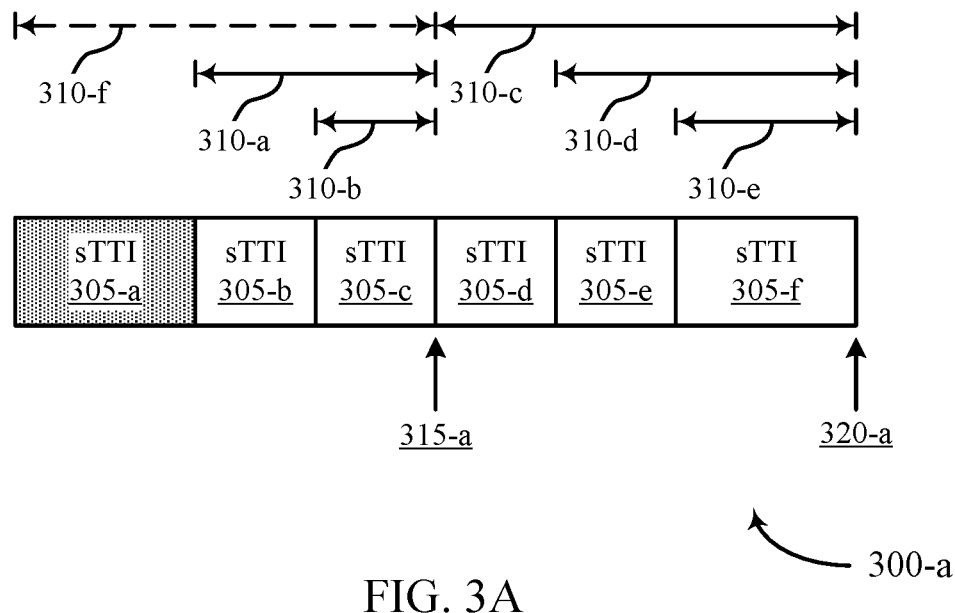
Figure 3B:
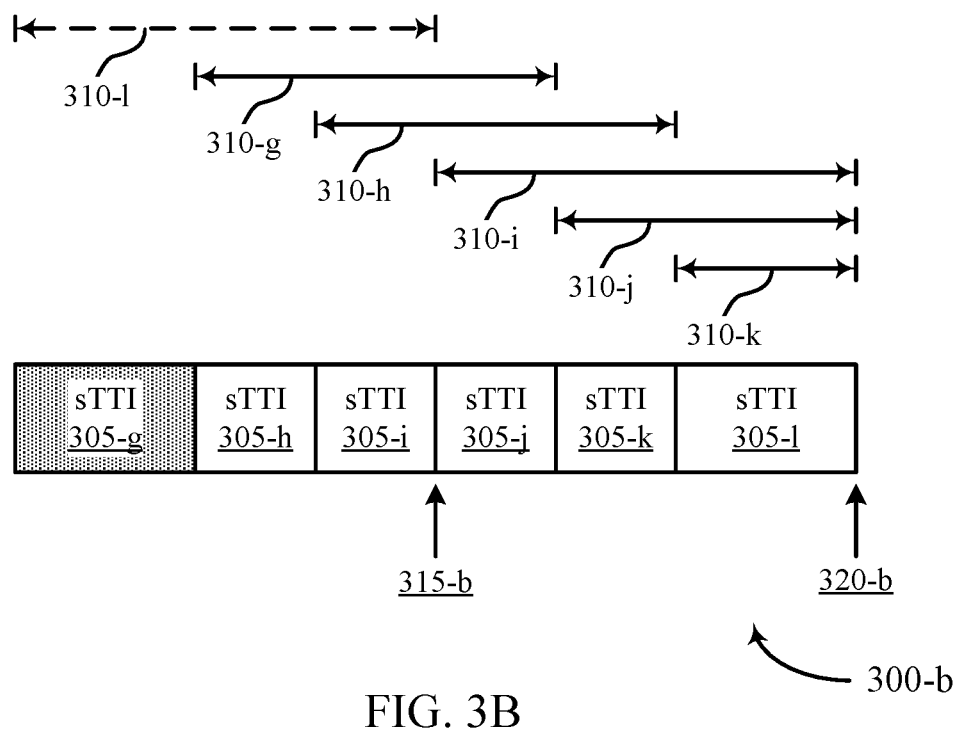

FIGS. 3A and 3B illustrate examples of subframe or slot configurations 300 that support TB repetition handling for downlink and uplink transmissions in accordance with aspects of the present disclosure. The subframe or slot configurations 300 may illustrate examples of repetition windows 310 for transmission repetition of TBs in the uplink or downlink, where the repetition windows 310 are constrained to a single subframe (e.g., for LTE systems) or slot (e.g., for NR systems). FIG. 3A illustrates an example where the repetition windows 310 for transmission repetition of TBs may be further constrained to a single slot within a subframe or a half-slot within a 14 OFDM symbol slot. As illustrated, a subframe may span two slots and contain six sTTIs 305 configured in a 3-2-2-2-2-3 pattern, which defines the respective number of OFDM symbols in each sTTI of the subframe. The 3-2-2-2-2-3 pattern may be used to prevent one of the sTTIs 305 from spanning a slot boundary 315-a. Similarly to the sTTI 305 configuration, the repetition windows 310 corresponding to each sTTI 305 may not span the slot boundary 315-a. In other cases, these sTTIs 305 may be examples of mini-slots within a 14 symbol slot. The mini-slot sizes and timings within the slot may be dynamically defined (e.g., based on information processing, transmission scheduling, etc.).

Each repetition window 310 may correspond to an sTTI 305 (e.g., based on the sTTI index). If an initial TB transmission occurs in a given sTTI 305, a wireless device may determine the number of transmission repetitions to perform for the TB based on the sTTI index for this initial transmission. The repetition windows 310 configured for each sTTI 305 may be further based on the slot boundary 315-a and the subframe boundary 320-a. For example, if an initial transmission of a TB is scheduled for sTTI 305-b, a wireless device (e.g., a base station 105, UE 115, or both) may identify the corresponding repetition window 310-a for transmission repetitions of the TB based on the sTTI index of sTTI 305-b. In some cases, the term "transmission repetitions" may refer to every transmission of the TB in the repetition process (e.g., including the initial transmission). Repetition window 310-a may span sTTI 305-a and sTTI 305-b, corresponding to a repetition factor of K=2. The repetition factor K may indicate the number of transmissions of the same TB for a device to perform (e.g., without waiting for any acknowledgment of the TB), where the value of K is equal to the number of sTTIs 305 spanned by the repetition window 310. In the scenario described above, a device may initially transmit a TB in sTTI 305-b, and may transmit the same TB again in sTTI 305-c. Repetition window 310-a may stop at sTTI 305-c due to the slot boundary 315-a.

Repetition windows 310 for the other sTTI indexes may be defined in a similar manner. For example, sTTI 305-c may correspond to repetition window 310-b with a K value of 1, sTTI 305-d may correspond to repetition window 310-c with a K value of 3 (e.g., where the repetition window 310 ends based on the subframe boundary 320-a), sTTI 305-e may correspond to repetition window 310-d with a K value of 2, and sTTI 305-f may correspond to repetition window 310-e with a K value of 1. These repetition factors K for the given repetition windows 310 are provided as examples, and other K values may be implemented for repetition windows 310 corresponding to certain sTTI indexes (or, similarly, certain initial symbols or mini-slots for TB transmission).

In some cases (e.g., if the subframe or slot configuration 300-*a* corresponds to a downlink TB transmission), sTTI 305-*a* may correspond to a control sTTI 305. For example, a control format indicator (CFI) transmitted via RRC may indicate that sTTI 305-*a* is configured for control channel signaling. As such, initial TB transmissions may not occur in sTTI 305-*a*, and no repetition window 310 may be defined to correspond to this sTTI index. In other cases (e.g., if the subframe or slot configuration 300-*a* corresponds to an uplink TB transmission), sTTI 305-*a* may support TB transmissions, and the sTTI index for sTTI 305-*a* may correspond to repetition window 310-*f*. In the example described above, repletion window 310-*f* may correspond to a repetition factor of K=3.

FIG. 3B illustrates an example where the repetition windows 310 for transmission repetition of TBs may span multiple slots within a subframe, but may not span multiple subframes. Alternatively, for some wireless communications systems (e.g., NR systems), FIG. 3B may illustrate repetition windows 310 for transmission repetition of TBs within a slot spanning 14 OFDM symbols. As described above, the subframe or slot configuration 300-*b* may include sTTIs 305-*h*, 305-*i*, 305-*j*, 305-*k*, and 305-*l* with sTTI indexes corresponding to repetition windows 310-*g*, 310-*h*, 310-*i*, 310-*j*, and 310-*k*, respectively. In some cases, these sTTIs 305 may correspond to mini-slots within a slot, where the repetition windows 310 may be based on the time resources for an initial mini-slot (e.g., an initial symbol of a mini-slot, a length of a mini-slot, a final symbol of a mini-slot, a span in time for a mini-slot, etc.). These repetition windows 310 may be based on the time resources (e.g., an sTTI index, an initial OFDM symbol, etc.) of an initial transmission of a TB, as well as a subframe boundary 320-*b*, which in some cases may be referred to as a slot boundary. However, the repetition windows 310 in subframe or slot configuration 300-*b* may not be based on the slot boundary 315-*b* (or, in some cases, the system may not include slot boundary 315-*b*). For example, as illustrated, repetition windows 310 for sTTIs 305 in the first slot of the subframe may cross the slot boundary 315-*b*. Alternatively, in some systems, 320-*b* may correspond to a slot boundary, and 315-*b* may not correspond to any defined term or time boundary.

In some cases, the system may implement a maximum number of repetition transmissions $K_{max}$. The value of $K_{max}$ may be pre-determined or dynamically configured, and may correspond to any number of sTTIs 305 or mini-slots (e.g., $K_{max}$ may have a value of 1, 2, 3, 4, 5, etc.). In one example (e.g., where $K_{max}$=3), repetition windows 310-*g* and 310-*h* may have the maximum repetition factor K=3, and may span the slot boundary 315-*b*. The repetition windows 310 may be determined for an sTTI index or initial mini-slot based on the lower of the number of sTTIs 305 (or mini-slots) before a boundary and the $K_{max}$ value. For example, sTTI 305-*h* has five sTTIs 305 before the subframe boundary 320-*b* (e.g., including sTTI 305-*h*), and accordingly would correspond to a repetition window 310-*g* defined by the $K_{max}$ value of three. In contrast, sTTI 305-*k* has two sTTIs 305 before the subframe boundary 320-*b*, and accordingly would correspond to a repetition window 310-*j* defined by this number of sTTIs 305, as the number is lower than the $K_{max}$ value of three. As before, depending on the link direction for the TB transmissions, sTTI 305-*g* may or may not correspond to a repetition window 310-*l*.

FIGS. 4A and 4B illustrate examples of subframe or slot configurations 400 that support TB repetition handling for downlink and uplink transmissions in accordance with aspects of the present disclosure. The subframe or slot configurations 400 may illustrate examples of repetition windows 410 for transmission repetition of TBs in the uplink, where the repetition windows 410 may span one or more subframes or slots. In some cases, the following configurations may apply to downlink TB transmissions as well. FIG. 4A illustrates an example where the repetition windows 410 that cross a subframe boundary 420-*a* may utilize an entire slot of the second subframe for improved reliability of the TB transmission. For example, a first subframe may include sTTIs 405-*a*, 405-*b*, 405-*c*, 405-*d*, 405-*e*, and 405-*f*, while a subsequent second subframe may include sTTIs 405-*g*, 405-*h*, 405-*i*, 405-*j*, and additional sTTIs 405 not pictured. Each subframe may be divided into two portions (e.g., using slot boundaries 415-*a* and 415-*b*). As illustrated, repetition windows 410 may be configured to span slot boundaries 415, subframe boundaries 420, or both.

The repetition windows 410 may be defined based on a maximum repetition number $K_{max}$, a minimum repetition number $K_{min}$, or both. This $K_{min}$ value may be based on a minimum number of transmission repetitions needed to meet a certain TB reliability threshold. For example, this TB reliability threshold may be based on a packet error rate for receiving the TB within the repetition window. In some cases, the TB reliability may be further based on a pre-defined latency threshold or a service level associated with the wireless device. In one example, the system may implement a $K_{min}$ value of 3, and a soft $K_{max}$ value of 3. For this value of $K_{min}$ and soft value of $K_{max}$, repetition windows 410-*a*, 410-*b*, 410-*c*, and 410-*d* may correspond to repetition factors of K=3 without spanning multiple subframes. However, implementing a minimum repetition factor of K=3 for TB transmissions that start in either sTTI 405-*e* or sTTI 405-*f* may result in repetition windows 410-*e* and 410-*f* spanning the subframe boundary 420-*a*. In subframe configuration 400-*a*, any repetition windows 410 that cross into a second subframe may be extended to span the entire first slot of the second subframe (e.g., up to slot boundary 415-*b*). As such, these repetition windows 410-*e* and 410-*f* may ignore the soft $K_{max}$ value, as in this example repetition window 410-*e* corresponds to a repetition factor of K=5 and repetition window 410-*f* corresponds to a repetition factor of K=4.

Extending the repetition windows 410 that span multiple subframes to fill an entire slot may improve the reliability of the TB transmission. For example, different subframes may correspond to different TPC parameters, as TPC may be applied by a wireless device at subframe boundaries 420. Accordingly, repeated transmissions of a TB in different subframes may utilize different transmit powers, making coherent reception not possible for a receiving device. The transmitting device (e.g., a UE 115) may add additional transmission repetitions (e.g., in sTTIs 405-*h*, 405-*i*, or both) to span the first slot of the second subframe and compensate for the lack of coherent reception. By adding these additional repetitions up to—but not over—the slot boundary 415-*b*, the repetition windows 410 crossing the subframe boundary 420-*a* may affect parameters of the first slot of the second subframe, but may not affect parameters of the second slot. Additionally, the transmitting device may be configured to transmit reference signals (e.g., demodulation reference signals (DMRSs)) on both sides of the subframe boundary 420-*a* (e.g., within the repetition window 410) to support reception of the transmission repetitions with different TPC parameters.

FIG. 4B illustrates a subframe or slot configuration 400-*b* for a first subframe or slot including sTTIs 405-*k*, 405-*l*, 405-*m*, 405-*n*, 405-*o*, and 405-*p* that is followed by a second subframe or slot containing sTTIs 405-*q*, 405-*r*, 405-*s*, 405-*t*, and additional sTTIs 405 not pictured. In subframe or slot configuration 400-*b*, the repetition windows 410 for transmission repetition of TBs may span up to a hard maximum repetition number $K_{max}$, whether or not the repetition windows 410 span a subframe or slot boundary 420-*b*. In these cases, the repetition windows 410 corresponding to each sTTI index may not be based on the slot boundaries 415-*c* or 415-*d*, or based on the subframe boundary 420-*b*. Instead, each sTTI 405 (or each mini-slot) may correspond to a repetition window 410 with a repetition factor K. These repetition factors K may all be the same (e.g., if all are set to the same hard maximum repetition number $K_{max}$), or may be different. As illustrated, sTTIs 405-*k*, 405-*l*, 405-*m*, 405-*n*, 405-*o*, and 405-*p* may correspond to repetition windows 410-*g*, 410-*h*, 410-*i*, 410-*j*, 410-*k*, and 410-*l* respectively, where each repetition window 410 spans three sTTIs 405 or mini-slots. In some cases, the repetition factors K may be selected to not span past the first slot of the second subframe. For example, the repetition factor K for repetition window 410-*l* corresponding to sTTI 405-*p* may be four or less, so as not to cross slot boundary 415-*d* and affect the second slot of the second subframe.

Figure 5:
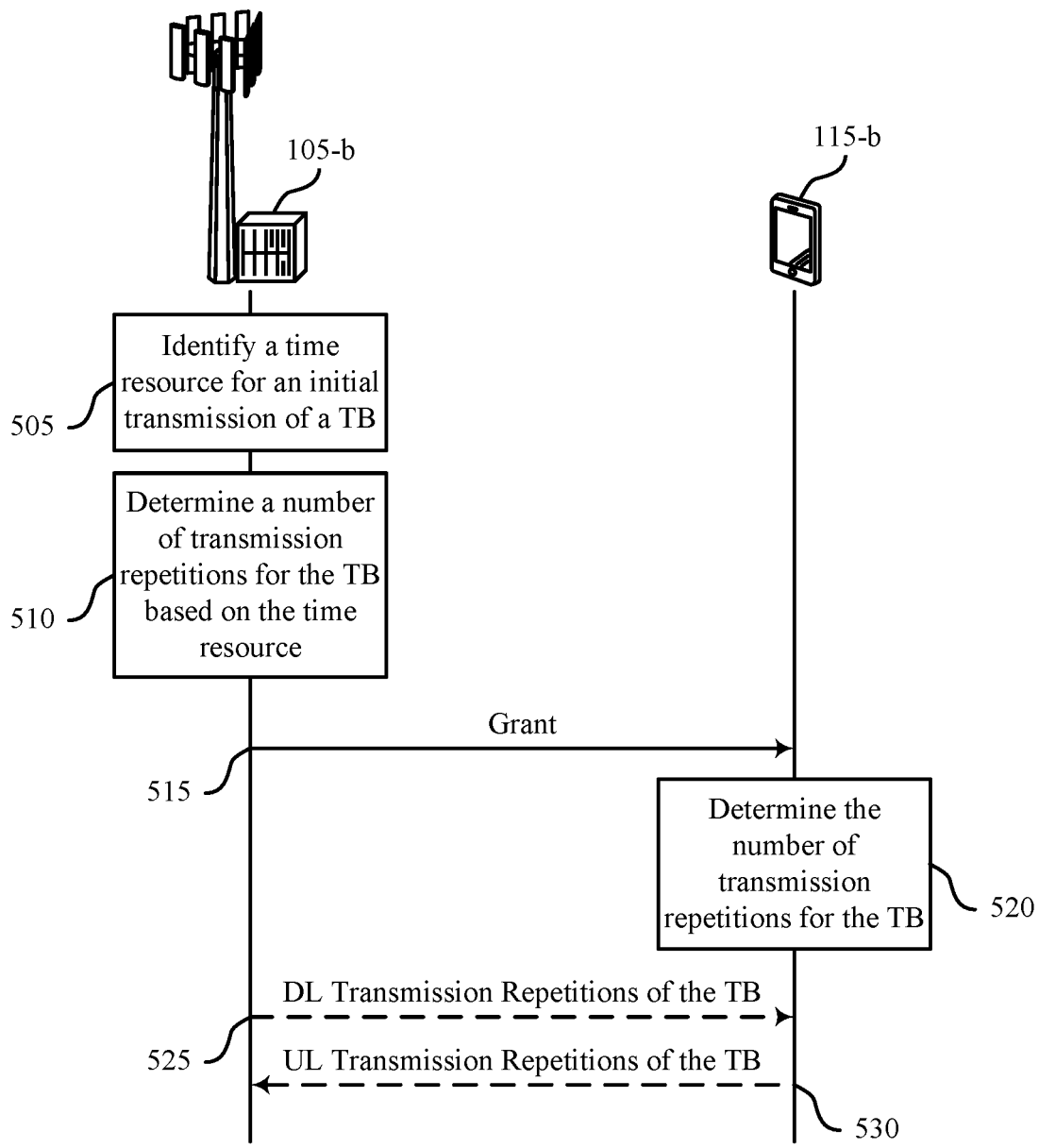
FIG. 5 illustrates an example of a process flow that supports TB repetition handling for downlink and uplink transmissions in accordance with aspects of the present disclosure.

FIG. 5 illustrates an example of a process flow 500 that supports TB repetition handling for downlink and uplink transmissions in accordance with aspects of the present disclosure. Process flow 500 may include base station 105-*b* and UE 115-*b*, which may be examples of the corresponding devices described with reference to FIGS. 1 and 2. Base station 105-*b* may send grants (e.g., in control information) to UE 115-*b* to schedule either uplink or downlink transmission repetitions for a TB. In some implementations, the processes described below may be performed in a different order, or may include one or more additional or alternative processes performed by the wireless devices.

At 505, base station 105-*b* may identify a time resource (e.g., a TTI or TTI index, an initial mini-slot, a symbol, etc.) for an initial transmission of a TB. This TB may be an example of an uplink TB or a downlink TB, and the TTI may also be referred to as an sTTI. In some cases, the TTI may be referred to as a mini-slot or set of OFDM symbols and may span any length of time (e.g., one symbol, two symbols, three symbols, etc.). At 510, base station 105-*b* may determine a number of transmission repetitions of the TB based at least in part on the time resource. In some cases, the correlation between the number of transmission repetitions and the time resource may be based on a slot boundary, a subframe boundary, or both. For example, base station 105-*b* may determine a proximity in time of the time resource for the initial TB transmission to the slot boundary and may determine the number of repetitions based on this proximity.

At 515, base station 105-*b* may transmit a grant to UE 115-*b* (e.g., in control information). This grant may be an example of a downlink grant or an uplink grant. The grant may indicate resources to use for TB transmission or TB reception, including an indication of the time resource (e.g., using a TTI index, a symbol index, a mini-slot indicator, etc.) for the initial transmission of the TB. At 520, UE 115-*b* may determine the number of transmission repetitions of the TB. For example, in some cases, the control information may additionally include an indication of the number of transmission repetitions (e.g., the repetition factor K) that was determined based on the time resource at the base station, and UE 115-*b* may determine the number of transmission repetitions based on this indicated value. In other cases, UE 115-*b* may determine the number of transmission repetitions based on the indicated time resource (e.g., the TTI index, the symbol index, the mini-slot, etc.).

Depending on the direction of the link, base station 105-*b* may transmit the transmission repetitions of the TB at 525 or UE 115-*b* may transmit the transmission repetitions of the TB at 530. For example, in the downlink case, bases station 105-*b* may transmit the TB repetitions at 525, and UE 115-*b* may monitor for the transmission repetitions of the TB based on the determined number of transmission repetitions. For example, UE 115-*b* may monitor in a repetition window starting with the TTI or mini-slot corresponding to the indicated time resource and spanning a number of TTIs or mini-slots equal to the determined number of transmission repetitions. UE 115-*b* may receive the TB based on receiving one or more of the downlink transmission repetitions of the TB during the monitoring process. Alternatively, for the uplink case, UE 115-*b* may transmit uplink transmission repetitions of the TB at 530 based on the determined number of transmission repetitions, and base station 105-*b* may monitor for these TB repetitions in the repetition window defined by the initial TTI or mini-slot and the number of transmission repetitions.

Figure 6:
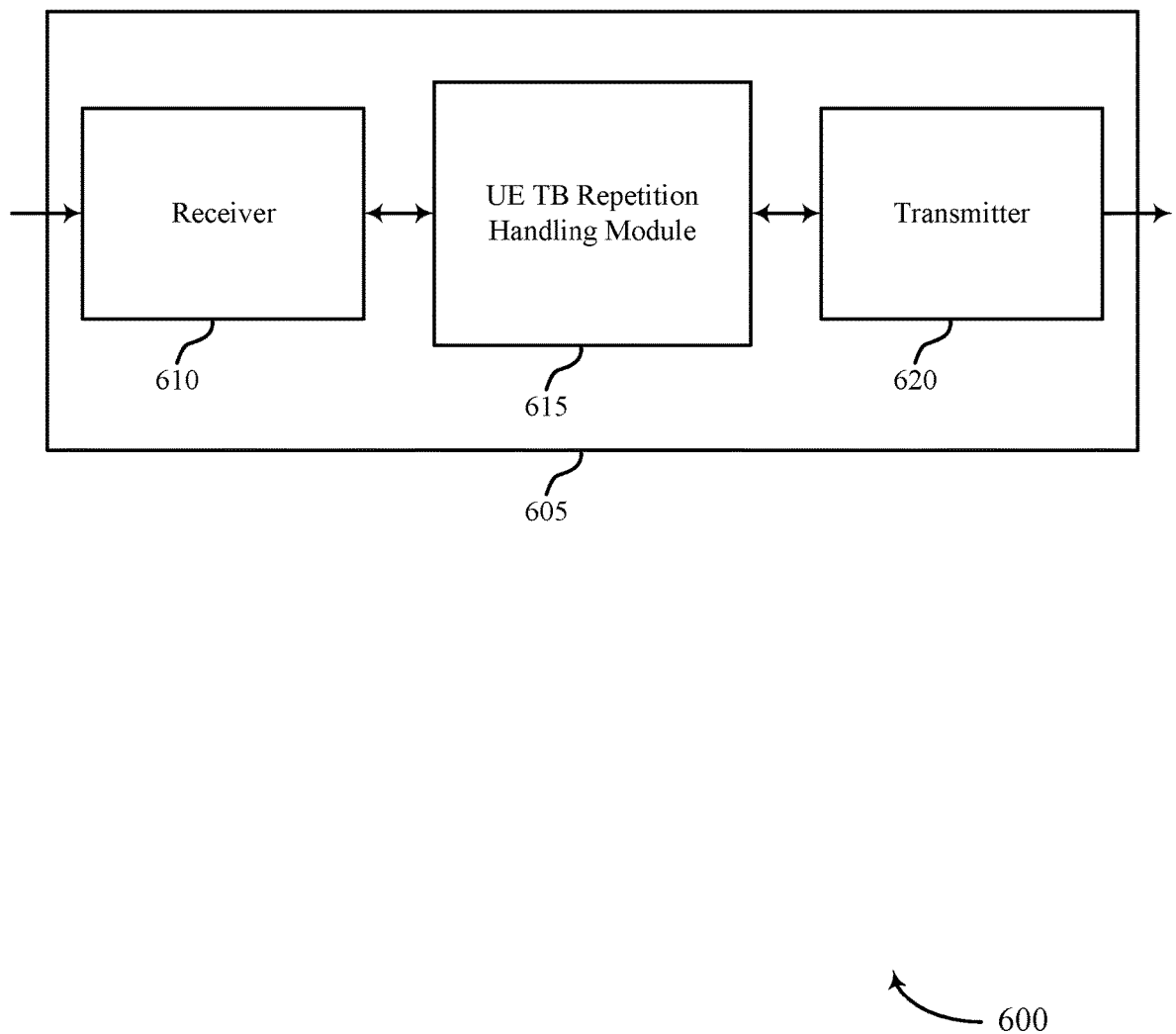
FIGS. 6 and 7 show block diagrams of a device that supports TB repetition handling for downlink and uplink transmissions in accordance with aspects of the present disclosure.

FIG. 6 shows a block diagram 600 of a wireless device 605 that supports TB repetition handling for downlink and uplink transmissions in accordance with aspects of the present disclosure. Wireless device 605 may be an example of aspects of a UE 115 as described herein. Wireless device 605 may include receiver 610, UE TB repetition handling module 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to TB repetition handling for downlink and uplink transmissions, etc.). Information may be passed on to other components of the device. The receiver 610 may be an example of aspects of the transceiver 935 described with reference to FIG. 9. The receiver 610 may utilize a single antenna or a set of antennas.

UE TB repetition handling module 615 may be an example of aspects of the UE TB repetition handling module 915 described with reference to FIG. 9.

UE TB repetition handling module 615 and/or at least some of its various sub-components may be implemented in hardware, software executed by a processor, firmware, or any combination thereof. If implemented in software executed by a processor, the functions of the UE TB repetition handling module 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The UE TB repetition handling module 615 and/or at least some of its various sub-components may be physically located at various positions, including being distributed such that portions of functions are implemented at different physical locations by one or more physical devices. In some examples, UE TB repetition handling module 615 and/or at least some of its various sub-components may be a separate and distinct component in accordance with various aspects of the present disclosure. In other examples, UE TB repetition handling module 615 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

In some cases, UE TB repetition handling module 615 may receive control information including a downlink grant, where the downlink grant indicates a resource in time (e.g., a TTI using a TTI index, a mini-slot, an initial OFDM symbol, etc.) for an initial transmission of a TB, determine a number of transmission repetitions of the TB based on the resource in time (e.g., based on the proximity of the resource in time to a subframe or slot boundary), and monitor for the transmission repetitions of the TB based on the downlink grant and the determined number of transmission repetitions.

In other cases, UE TB repetition handling module 615 may receive control information including an uplink grant, where the uplink grant indicates a resource in time (e.g., a TTI index) for an initial transmission of a TB, determine a number of transmission repetitions of the TB based on a proximity of the resource in time to one or both of a subframe boundary and slot boundary (e.g., based on the TTI index), and transmit the transmission repetitions of the TB based on the uplink grant and the determined number of transmission repetitions.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
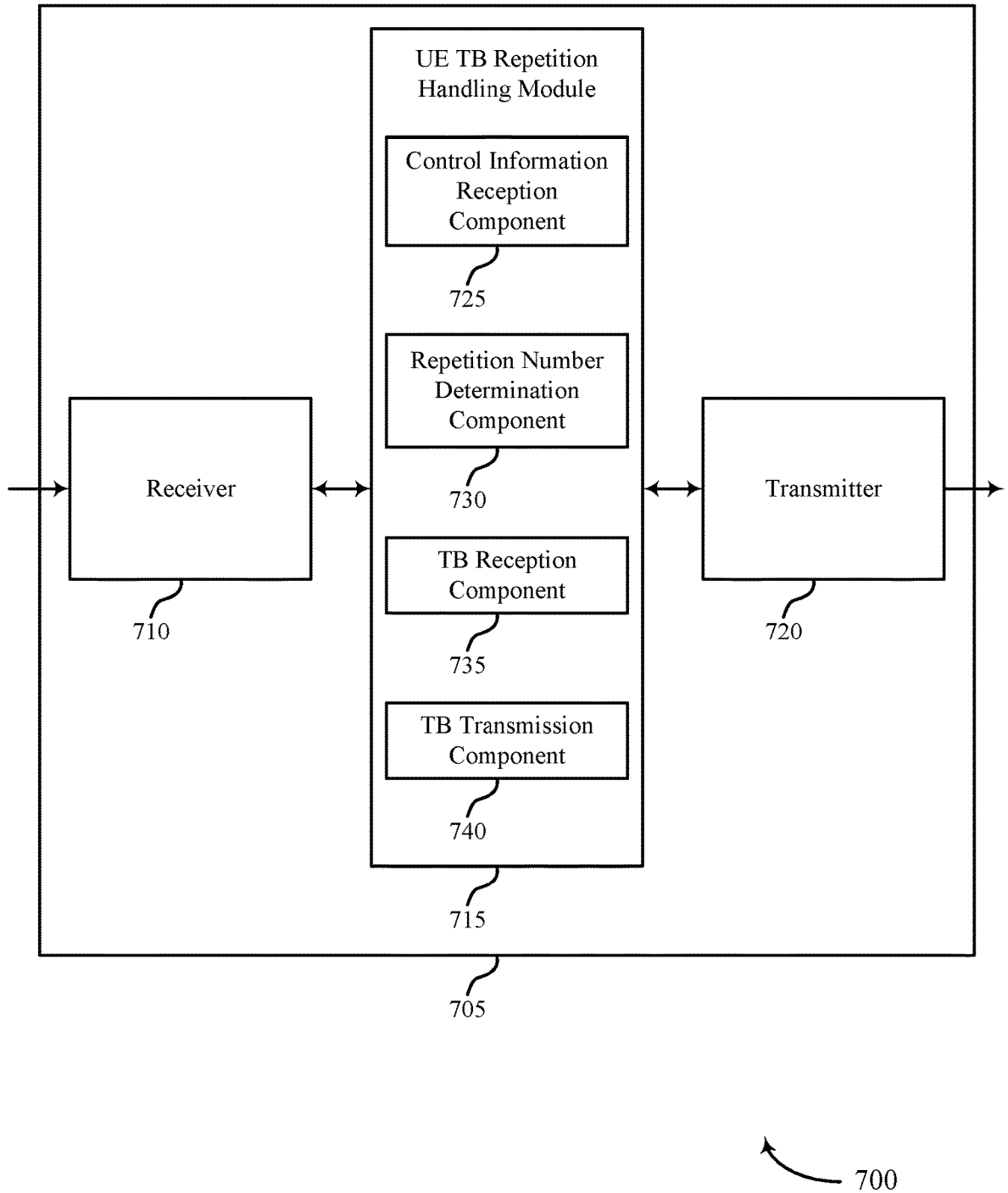

FIG. 7 shows a block diagram 700 of a wireless device 705 that supports TB repetition handling for downlink and uplink transmissions in accordance with aspects of the present disclosure. Wireless device 705 may be an example of aspects of a wireless device 605 or a UE 115 as described with reference to FIG. 6. Wireless device 705 may include receiver 710, UE TB repetition handling module 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to TB repetition handling for downlink and uplink transmissions, etc.). Information may be passed on to other components of the device. The receiver 710 may be an example of aspects of the transceiver 935 described with reference to FIG. 9. The receiver 710 may utilize a single antenna or a set of antennas.

UE TB repetition handling module 715 may be an example of aspects of the UE TB repetition handling module 915 described with reference to FIG. 9. UE TB repetition handling module 715 may also include control information reception component 725, repetition number determination component 730, TB reception component 735, and TB transmission component 740.

In some cases, control information reception component 725 may receive control information including a downlink grant, where the downlink grant indicates a resource in time (e.g., using a TTI index, a mini-slot indicator, an initial OFDM symbol indicator, etc.) for an initial transmission of a TB. Repetition number determination component 730 may determine a number of transmission repetitions of the TB based on the resource in time (e.g., based on the TTI index, mini-slot indicator, initial OFDM symbol indicator, etc.). For example, the repetition number determination component 730 may determine a number of transmission repetitions based on a proximity of the resource in time to a slot or subframe boundary. TB reception component 735 may monitor for the transmission repetitions of the TB based on the downlink grant and the determined number of transmission repetitions.

In other cases, control information reception component 725 may receive control information including an uplink grant, where the uplink grant indicates a resource in time for an initial transmission of a TB. Repetition number determination component 730 may determine a number of transmission repetitions of the TB based on a proximity of the resource in time to one or both of a subframe boundary and slot boundary. TB transmission component 740 may transmit the transmission repetitions of the TB based on the uplink grant and the determined number of transmission repetitions.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
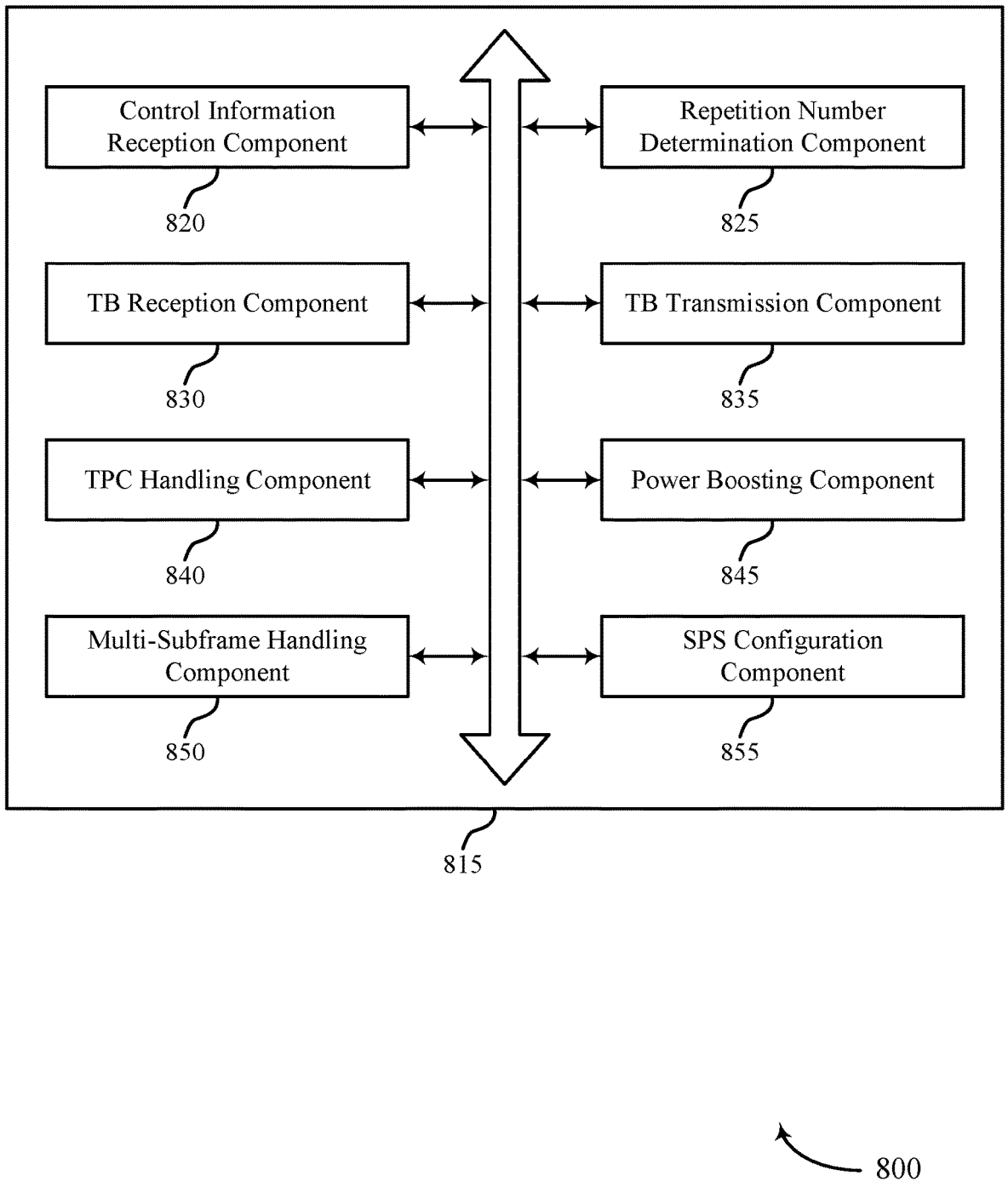
FIG. 8 shows a block diagrams of a user equipment (UE) TB repetition handling module that supports TB repetition handling for downlink and uplink transmissions in accordance with aspects of the present disclosure.

FIG. 8 shows a block diagram 800 of a UE TB repetition handling module 815 that supports TB repetition handling for downlink and uplink transmissions in accordance with aspects of the present disclosure. The UE TB repetition handling module 815 may be an example of aspects of a UE TB repetition handling module 615, a UE TB repetition handling module 715, or a UE TB repetition handling module 915 described with reference to FIGS. 6, 7, and 9. The UE TB repetition handling module 815 may include control information reception component 820, repetition number determination component 825, TB reception component 830, TB transmission component 835, TPC handling component 840, power boosting component 845, multi-subframe handling component 850, and SPS configuration component 855. Each of these modules may communicate, directly or indirectly, with one another (e.g., via one or more buses).

Control information reception component 820 may receive control information including a downlink grant, where the downlink grant indicates a resource in time for an initial transmission of a TB. In other cases, control information reception component 820 may receive control information including an uplink grant, where the uplink grant indicates a resource in time for an initial transmission of a TB.

Repetition number determination component 825 may determine a number of transmission repetitions of the TB based on the resource in time. For example, repetition number determination component 825 may determine the number of transmission repetitions of the TB based on a proximity of the resource in time to one or both of a subframe boundary (e.g., in LTE systems) and slot boundary (e.g., in NR systems). In some cases, determining the number of transmission repetitions of the TB includes receiving an indication of the number of transmission repetitions of the TB in the control information. In some cases, the number of transmission repetitions of the TB is based on a number of OFDM symbols between the resource in time and the one or both of the subframe boundary and slot boundary. In some examples, the number of transmission repetitions of the TB is further based on a number of OFDM symbols in each TTI, mini-slot, or combination thereof. In some cases, a correlation between the number of transmission repetitions of the TB and the resource in time is RRC configured.

TB reception component 830 may monitor for the transmission repetitions of the TB based on the downlink grant and the determined number of transmission repetitions. In some cases, the downlink grant further indicates an additional time resource (e.g., with a TTI index) for an additional transmission of the TB based on a reliability threshold and the number of transmission repetitions. TB reception component 830 may monitor for the additional transmission of the TB based on the downlink grant. In some cases, each TB transmission of the transmission repetitions is received in a different TTI or mini-slot of a repetition window.

TB transmission component 835 may transmit the transmission repetitions of the TB based on the uplink grant and the determined number of transmission repetitions. In some cases, each TB transmission of the transmission repetitions is transmitted in a different TTI or mini-slot of a repetition window.

TPC handling component 840 may transmit the initial transmission of the TB in an initial TTI or mini-slot corresponding to the resource in time according to initial TPC parameters, receive a TPC command indicating different TPC parameters for an additional TTI index or mini-slot of the repetition window, and maintain the initial TPC parameters for a transmission repetition of the TB in the additional TTI or mini-slot.

Power boosting component 845 may perform power boosting for the transmission repetitions of the TB based on the determined number of transmission repetitions.

In some cases, the transmission repetitions of the TB span at least two subframes (e.g., in LTE systems) or at least two slots (e.g., in NR systems). In these cases, multi-subframe handling component 850 may transmit at least one DMRS in each subframe of the at least two subframes or in each slot of the at least two slots based on the transmission repetitions of the TB spanning the at least two subframes or slots. In some cases, transmitting the transmission repetitions of the TB includes multi-subframe handling component 850 transmitting a first set of transmission repetitions in a first subframe or slot according to a first set of TPC parameters and transmitting a second set of transmission repetitions in a second subframe or slot according to a second set of TPC parameters different from the first set of TPC parameters. In some cases, multi-subframe handling component 850 may add one or more additional transmission repetitions to the number of transmission repetitions of the TB based on a slot boundary for a second subframe of the at least two subframes.

SPS configuration component 855 may receive an SPS configuration, where the number of transmission repetitions of the TB is further based on the SPS configuration.

Figure 9:
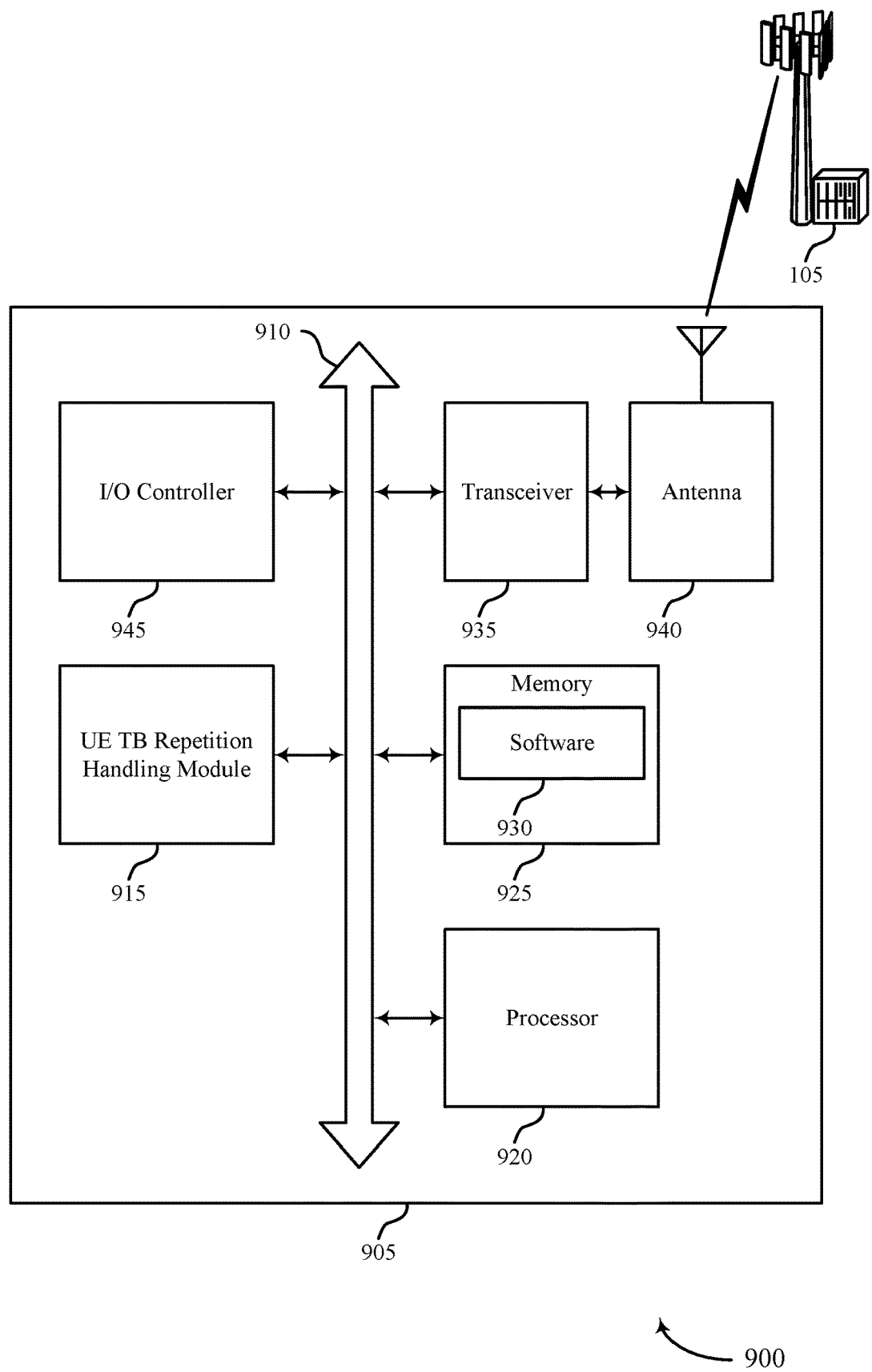
FIG. 9 shows a diagram of a system including a device that supports TB repetition handling for downlink and uplink transmissions in accordance with aspects of the present disclosure.

FIG. 9 shows a diagram of a system 900 including a device 905 that supports TB repetition handling for downlink and uplink transmissions in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE TB repetition handling module 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting TB repetition handling for downlink and uplink transmissions).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic I/O system (BIOS) which may control basic hardware or software operation such as the interaction with peripheral components or devices.

Software 930 may include code to implement aspects of the present disclosure, including code to support TB repetition handling for downlink and uplink transmissions. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
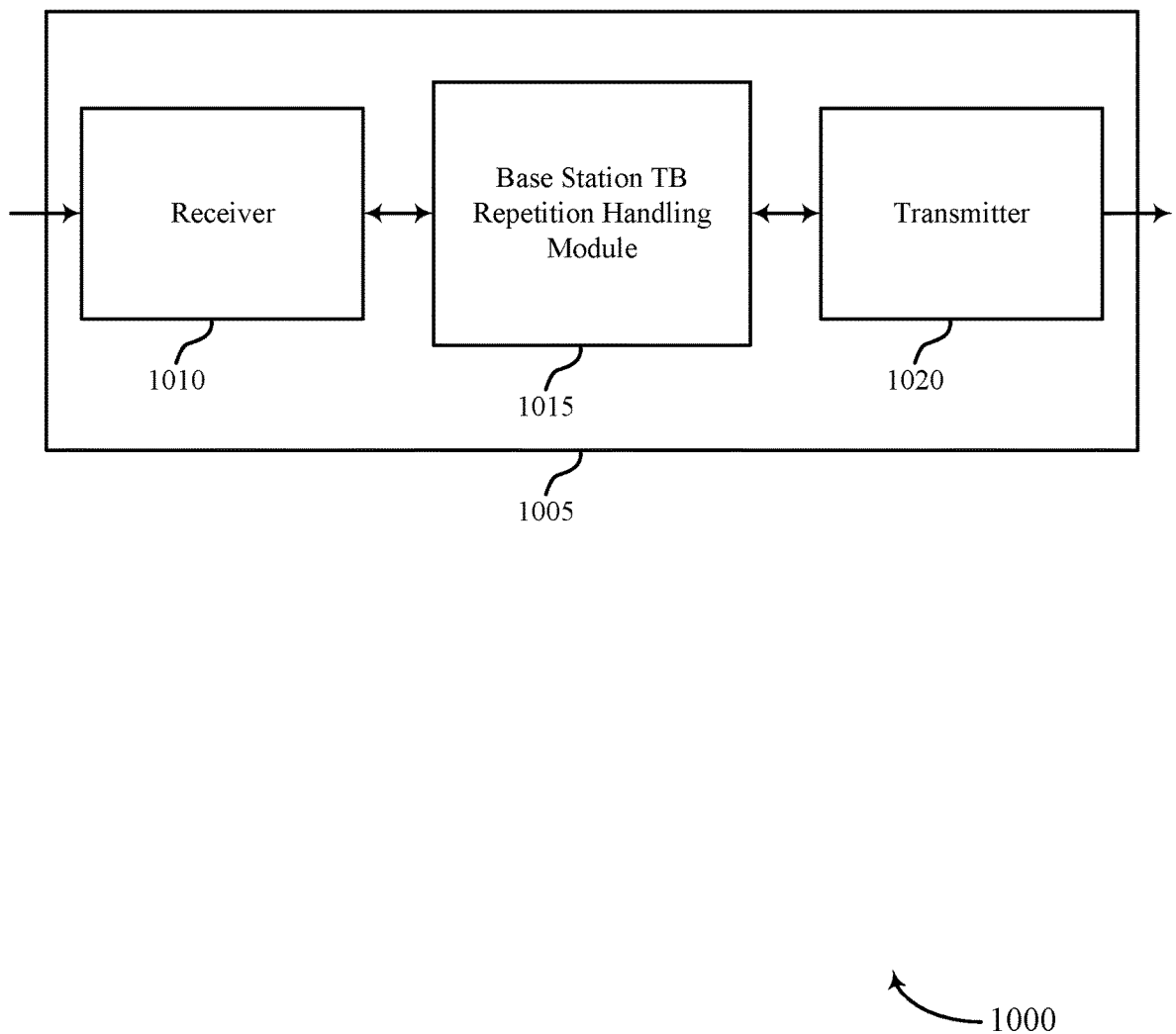
FIGS. 10 and 11 show block diagrams of a device that supports TB repetition handling for downlink and uplink transmissions in accordance with aspects of the present disclosure.

FIG. 10 shows a block diagram 1000 of a wireless device 1005 that supports TB repetition handling for downlink and uplink transmissions in accordance with aspects of the present disclosure. Wireless device 1005 may be an example of aspects of a base station 105 as described herein. Wireless device 1005 may include receiver 1010, base station TB repetition handling module 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to TB repetition handling for downlink and uplink transmissions, etc.). Information may be passed on to other components of the device. The receiver 1010 may be an example of aspects of the transceiver 1335 described with reference to FIG. 13. The receiver 1010 may utilize a single antenna or a set of antennas.

Base station TB repetition handling module 1015 may be an example of aspects of the base station TB repetition handling module 1315 described with reference to FIG. 13.

Base station TB repetition handling module 1015 and/or at least some of its various sub-components may be implemented in hardware, software executed by a processor, firmware, or any combination thereof. If implemented in software executed by a processor, the functions of the base station TB repetition handling module 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station TB repetition handling module 1015 and/or at least some of its various sub-components may be physically located at various positions, including being distributed such that portions of functions are implemented at different physical locations by one or more physical devices. In some examples, base station TB repetition handling module 1015 and/or at least some of its various sub-components may be a separate and distinct component in accordance with various aspects of the present disclosure. In other examples, base station TB repetition handling module 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some cases, base station TB repetition handling module 1015 may identify a resource in time (e.g., a TTI index, an initial OFDM symbol, a mini-slot, etc.) for an initial transmission of a TB and may determine a number of transmission repetitions of the TB based on the resource in time (e.g., the TTI index, symbol, mini-slot, etc.). For example, the number of transmission repetitions may be determined based on a proximity of the resource in time to one or both of a subframe boundary and slot boundary. Base station TB repetition handling module 1015 may transmit control information including a downlink grant, where the downlink grant indicates the resource in time (e.g., the TTI index, initial OFDM symbol, mini-slot, etc.) for the initial transmission of the TB and may transmit the transmission repetitions of the TB based on the downlink grant and the determined number of transmission repetitions.

In other cases, the base station TB repetition handling module 1015 may identify a resource in time for an initial transmission of a TB, determine a number of transmission repetitions of the TB based on the resource in time (e.g., based on a proximity of the resource in time to one or both of a subframe boundary and slot boundary), transmit control information including an uplink grant, where the uplink grant indicates the resource in time for the initial transmission of the TB, and monitor for the transmission repetitions of the TB based on the uplink grant and the determined number of transmission repetitions.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
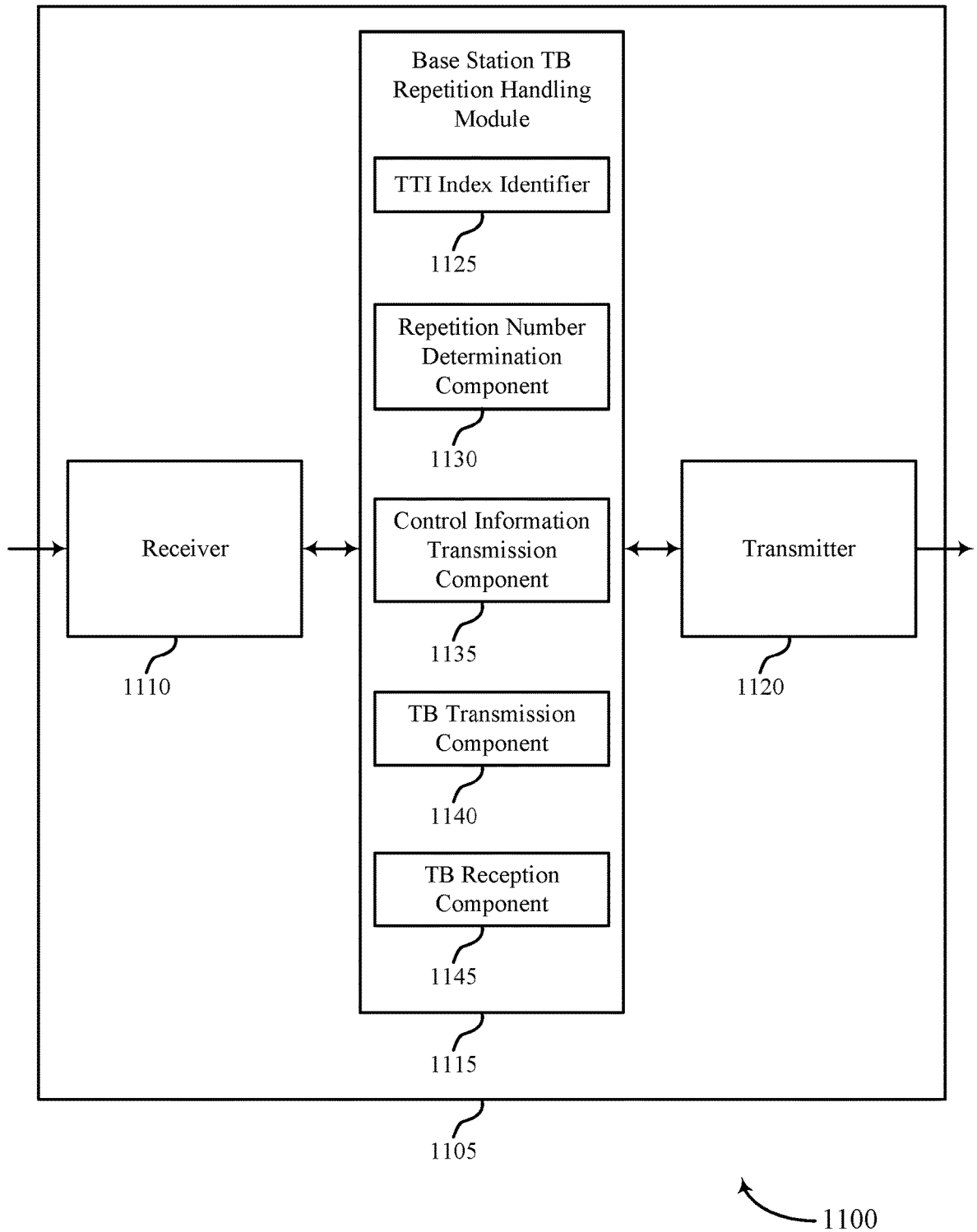

FIG. 11 shows a block diagram 1100 of a wireless device 1105 that supports TB repetition handling for downlink and uplink transmissions in accordance with aspects of the present disclosure. Wireless device 1105 may be an example of aspects of a wireless device 1005 or a base station 105 as described with reference to FIG. 10. Wireless device 1105 may include receiver 1110, base station TB repetition handling module 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to TB repetition handling for downlink and uplink transmissions, etc.). Information may be passed on to other components of the device. The receiver 1110 may be an example of aspects of the transceiver 1335 described with reference to FIG. 13. The receiver 1110 may utilize a single antenna or a set of antennas.

Base station TB repetition handling module 1115 may be an example of aspects of the base station TB repetition handling module 1315 described with reference to FIG. 13. Base station TB repetition handling module 1115 may also include TTI index identifier 1125, repetition number determination component 1130, control information transmission component 1135, TB transmission component 1140, and TB reception component 1145.

In some cases, TTI index identifier 1125 may identify a resource in time (e.g., a TTI index) for an initial transmission of a TB. Repetition number determination component 1130 may determine a number of transmission repetitions of the TB based on the initial transmission of the TB (e.g., the TTI index). For example, the repetition number determination component 1130 may determine the number of transmission repetitions based on a proximity of the resource in time to one or both of a subframe boundary and slot boundary. Control information transmission component 1135 may transmit control information including a downlink grant, where the downlink grant indicates the resource in time (e.g., the TTI index) for the initial transmission of the TB. TB transmission component 1140 may transmit the transmission repetitions of the TB based on the downlink grant and the determined number of transmission repetitions.

In other cases, TTI index identifier 1125 may identify a resource in time (e.g., a TTI index) for an initial transmission of a TB. Repetition number determination component 1130 may determine a number of transmission repetitions of the TB based on a proximity of the resource in time to one or both of a subframe boundary and slot boundary (e.g., based on the TTI index). Control information transmission component 1135 may transmit control information including an uplink grant, where the uplink grant indicates the resource in time (e.g., using the TTI index) for the initial transmission of the TB. TB reception component 1145 may monitor for the transmission repetitions of the TB based on the uplink grant and the determined number of transmission repetitions.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
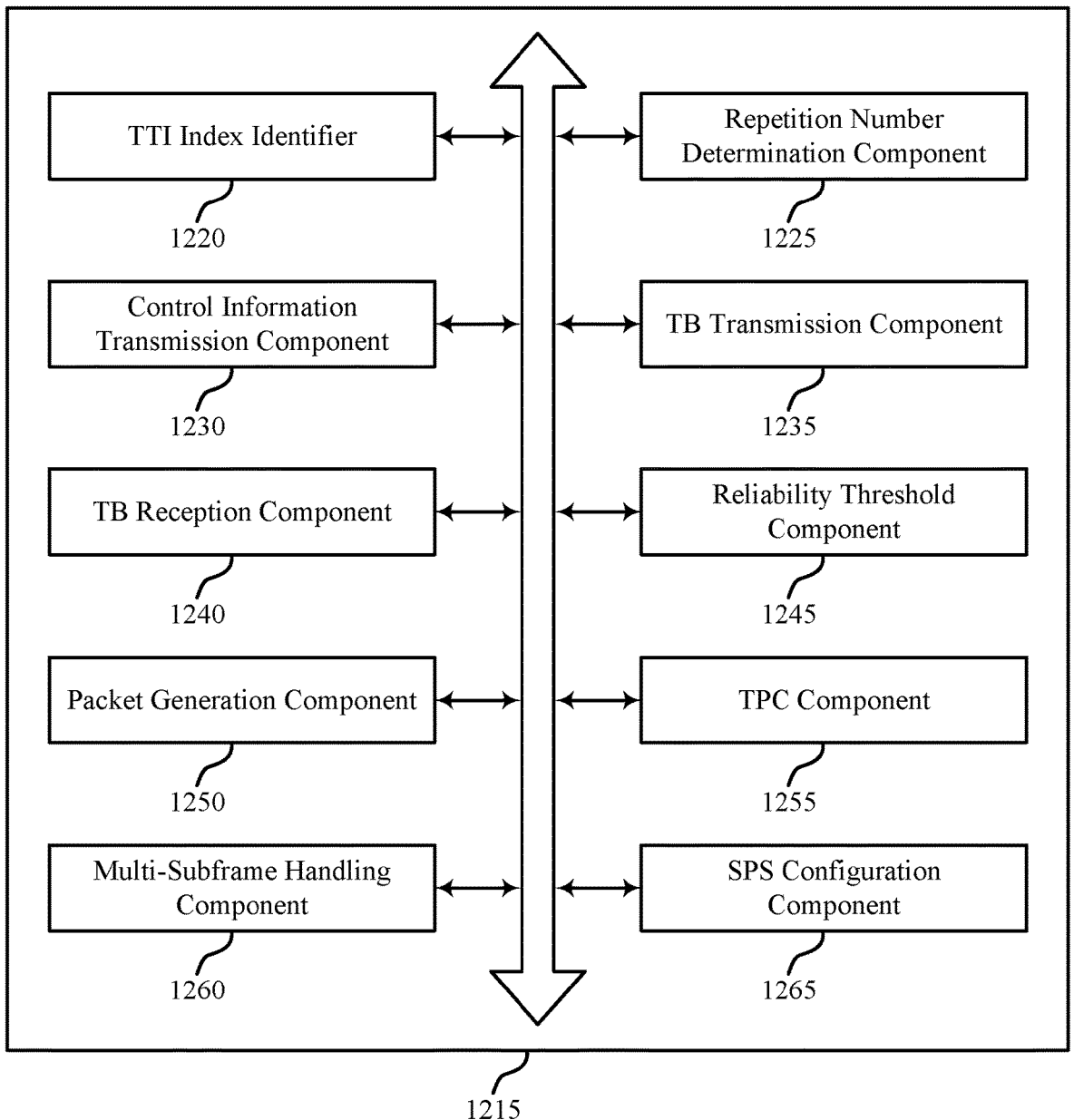
FIG. 12 shows a block diagram of a base station TB repetition handling module that supports TB repetition handling for downlink and uplink transmissions in accordance with aspects of the present disclosure.

FIG. 12 shows a block diagram 1200 of a base station TB repetition handling module 1215 that supports TB repetition handling for downlink and uplink transmissions in accordance with aspects of the present disclosure. The base station TB repetition handling module 1215 may be an example of aspects of a base station TB repetition handling module 1015, 1115, or 1315 described with reference to FIGS. 10, 11, and 13. The base station TB repetition handling module 1215 may include TTI index identifier 1220, repetition number determination component 1225, control information transmission component 1230, TB transmission component 1235, TB reception component 1240, reliability threshold component 1245, packet generation component 1250, TPC component 1255, multi-subframe handling component 1260, and SPS configuration component 1265. Each of these modules may communicate, directly or indirectly, with one another (e.g., via one or more buses).

TTI index identifier 1220 may identify a resource in time (e.g., based on a TTI index, a symbol index, a mini-slot indicator, etc.) for an initial transmission of a TB.

Repetition number determination component 1225 may determine a number of transmission repetitions of the TB. For example, the repetition number determination component 1225 may determine the number of transmission repetitions of the TB based on a proximity of the resource in time to a subframe boundary, a slot boundary, or both. In some cases, this determination may be based on the TTI index. In some cases, the number of transmission repetitions of the TB may be based on a number of OFDM symbols between the resource in time and the subframe boundary, slot boundary, or both. In some examples, the number of transmission repetitions of the TB may be further based on a number of OFDM symbols in each TTI, mini-slot, or combination thereof. In some cases, a correlation between the number of transmission repetitions of the TB and the resource in time is RRC configured.

In some cases, control information transmission component 1230 may transmit control information including a downlink grant, where the downlink grant indicates the resource in time (e.g., using a TTI index, symbol index, mini-slot indicator, etc.) for the initial transmission of the TB. In other cases, control information transmission component 1230 may transmit control information including an uplink grant, where the uplink grant indicates the resource in time for the initial transmission of the TB. In some cases, the control information further includes an indication of the number of transmission repetitions of the TB.

TB transmission component 1235 may transmit the transmission repetitions of the TB based on the downlink grant and the determined number of transmission repetitions. In some cases, each TB transmission of the transmission repetitions is transmitted in a different TTI (e.g., for LTE systems) or mini-slot (e.g., for NR systems) of a repetition window.

TB reception component 1240 may monitor for the transmission repetitions of the TB based on the uplink grant and the determined number of transmission repetitions. In some cases, each TB transmission of the transmission repetitions is monitored for in a different TTI or mini-slot of a repetition window. In some cases, the transmission repetitions of the TB are power boosted based on the determined number of transmission repetitions.

Reliability threshold component 1245 may determine a desired number of transmission repetitions for the TB based on a reliability threshold, compare the desired number of transmission repetitions for the TB to the determined number of transmission repetitions of the TB, determine that the desired number of transmission repetitions for the TB is greater than the determined number of transmission repetitions of the TB according to the comparing, and schedule an additional transmission of the TB in an additional TTI or mini-slot based on the determining.

Packet generation component 1250 may generate a packet for the TB, where the packet is ready for transmission at the resource in time (e.g., indicated by a TTI index, symbol index, mini-slot indicator, etc.).

TPC component 1255 may receive the initial transmission of the TB in an initial TTI or mini-slot corresponding to the resource in time according to initial TPC parameters, transmit a TPC command indicating different TPC parameters for an additional TTI or mini-slot in the repetition window, and receive a transmission repetition of the TB in the additional TTI or mini-slot according to the initial TPC parameters.

In some cases, the transmission repetitions of the TB span at least two subframes, slots, or a combination thereof. Multi-subframe handling component 1260 may receive at least one DMRS in each subframe/slot of the at least two subframes/slots based on the transmission repetitions of the TB spanning the at least two subframes/slots. In some cases, monitoring for the transmission repetitions of the TB includes monitoring, using a first DMRS received in a first subframe or slot, for a first set of transmission repetitions in the first subframe or slot associated with a first set of TPC parameters, and monitoring, using a second DMRS received in a second subframe or slot, for a second set of transmission repetitions in the second subframe or slot associated with a second set of TPC parameters different from the first set of TPC parameters. In some cases, multi-subframe handling component 1260 may add one or more additional transmission repetitions to the number of transmission repetitions of the TB based on a slot boundary for a second subframe of the at least two subframes/slots.

SPS configuration component 1265 may transmit an SPS configuration, where the number of transmission repetitions of the TB is further based on the SPS configuration.

Figure 13:
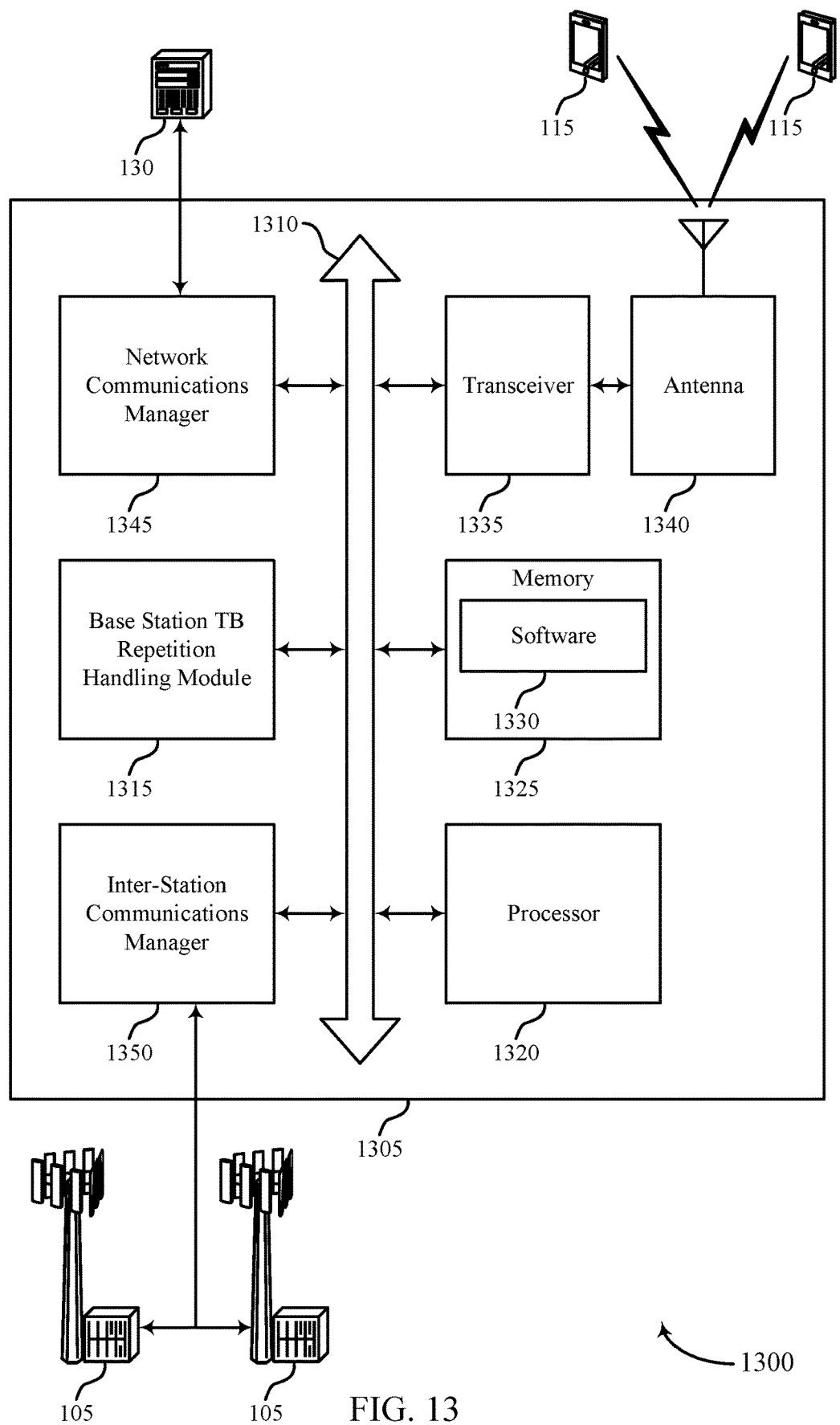
FIG. 13 shows a diagram of a system including a device that supports TB repetition handling for downlink and uplink transmissions in accordance with aspects of the present disclosure.

FIG. 13 shows a diagram of a system 1300 including a device 1305 that supports TB repetition handling for downlink and uplink transmissions in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station TB repetition handling module 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting TB repetition handling for downlink and uplink transmissions).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support TB repetition handling for downlink and uplink transmissions. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network 130 (e.g., via one or more wired backhaul links). For example, the network communications manager 1345 may manage the transfer of data communications for client devices, such as one or more UEs 115.

Inter-station communications manager 1350 may manage communications with other base station 105 and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
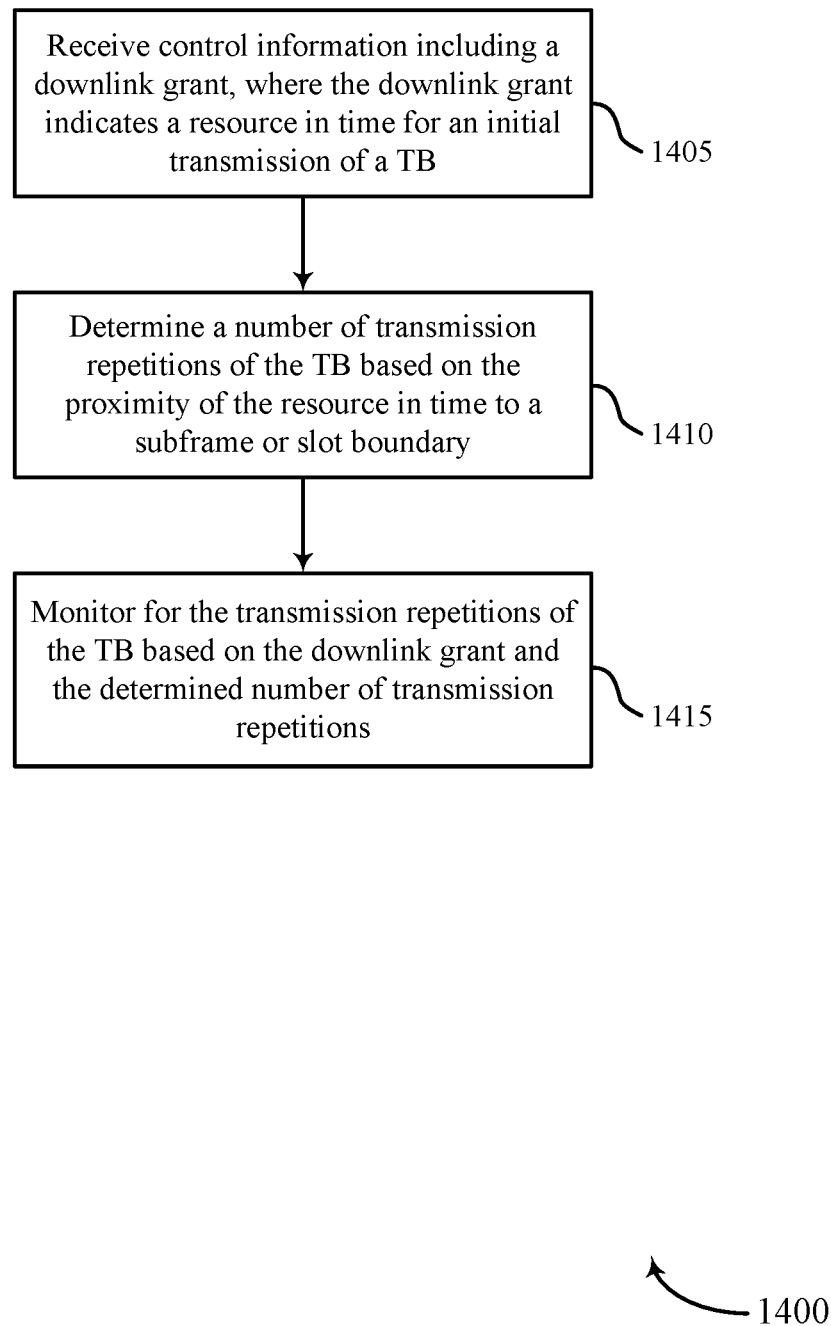
FIGS. 14 through 19 show flowcharts illustrating methods for TB repetition handling for downlink and uplink transmissions in accordance with aspects of the present disclosure.

FIG. 14 shows a flowchart illustrating a method 1400 for TB repetition handling for downlink and uplink transmissions in accordance with aspects of the present disclosure. The operations of method 1400 may be implemented by a UE 115 or its components as described herein. For example, the operations of method 1400 may be performed by a UE TB repetition handling module as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may receive control information including a downlink grant, where the downlink grant indicates a resource in time (e.g., an initial symbol, a TTI, a mini-slot, etc.) for an initial transmission of a TB. The operations of 1405 may be performed according to the methods described herein. In certain examples, aspects of the operations of 1405 may be performed by a control information reception component as described with reference to FIGS. 6 through 9.

At 1410 the UE 115 may determine a number of transmission repetitions of the TB based at least in part on a proximity of the resource in time to a subframe boundary, a slot boundary, or both. In some cases, the resource in time (e.g., a TTI index) may implicitly or explicitly indicate a maximum possible number of transmission repetitions for the TB. In these cases, a base station 105 transmitting the control information may include an indication of a number of transmission repetitions smaller than or equal to the maximum number. UE 115 may determine the number of actual transmission repetitions based on the maximum number or a dynamically configured smaller number of transmission repetitions. The operations of 1410 may be performed according to the methods described herein. In certain examples, aspects of the operations of 1410 may be performed by a repetition number determination component as described with reference to FIGS. 6 through 9.

At 1415 the UE 115 may monitor for the transmission repetitions of the TB based at least in part on the downlink grant and the determined number of transmission repetitions. The operations of 1415 may be performed according to the methods described herein. In certain examples, aspects of the operations of 1415 may be performed by a TB reception component as described with reference to FIGS. 6 through 9.

Figure 15:
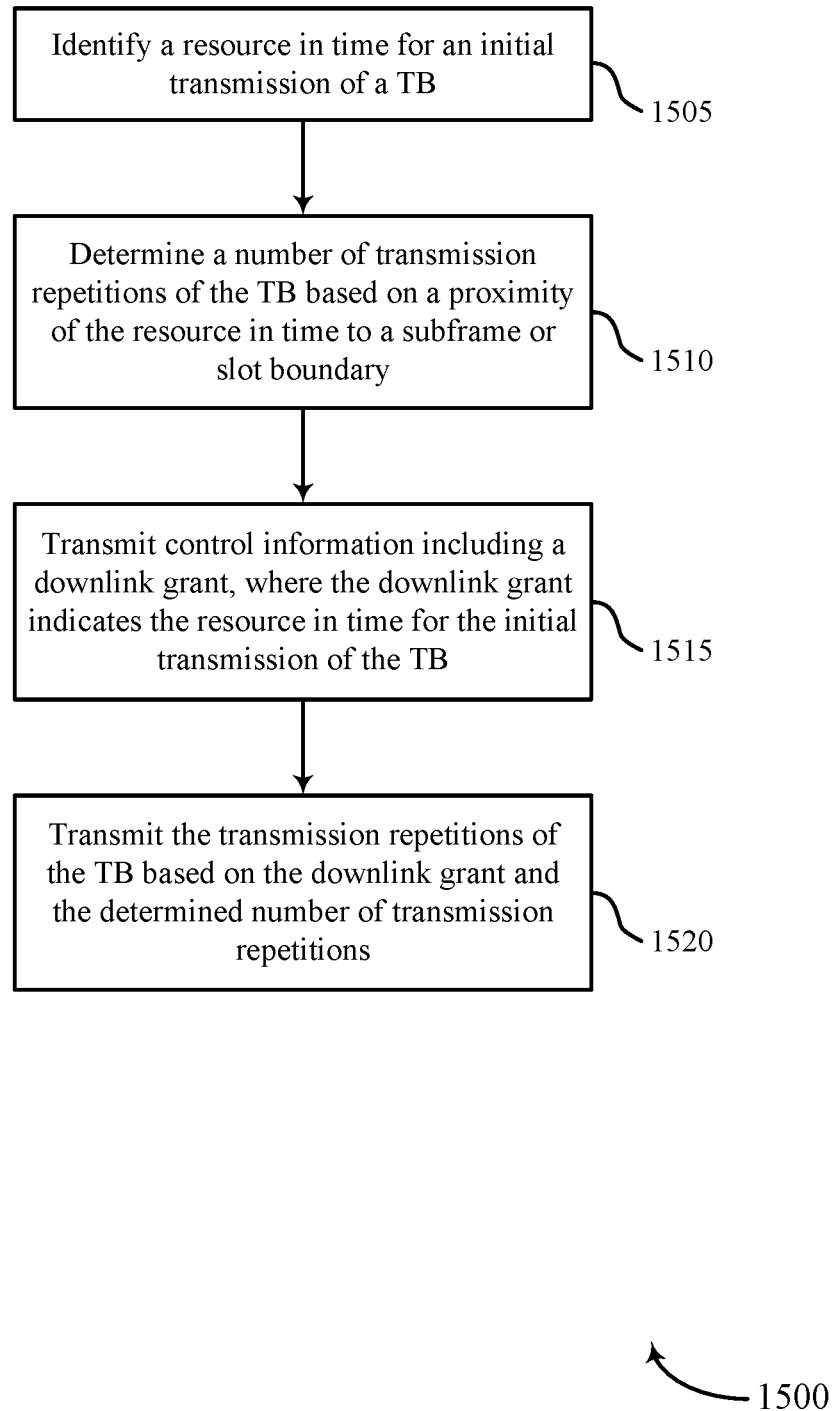

FIG. 15 shows a flowchart illustrating a method 1500 for TB repetition handling for downlink and uplink transmissions in accordance with aspects of the present disclosure. The operations of method 1500 may be implemented by a base station 105 or its components as described herein. For example, the operations of method 1500 may be performed by a base station TB repetition handling module as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1505 the base station 105 may identify a resource in time for an initial transmission of a TB. The operations of 1505 may be performed according to the methods described herein. In certain examples, aspects of the operations of 1505 may be performed by a TTI index identifier as described with reference to FIGS. 10 through 13.

At 1510 the base station 105 may determine a number of transmission repetitions of the TB based at least in part on a proximity of the resource in time to a subframe or slot boundary. The operations of 1510 may be performed according to the methods described herein. In certain examples, aspects of the operations of 1510 may be performed by a repetition number determination component as described with reference to FIGS. 10 through 13.

At 1515 the base station 105 may transmit control information including a downlink grant, where the downlink grant indicates the resource in time for the initial transmission of the TB. The operations of 1515 may be performed according to the methods described herein. In certain examples, aspects of the operations of 1515 may be performed by a control information transmission component as described with reference to FIGS. 10 through 13.

At 1520 the base station 105 may transmit the transmission repetitions of the TB based at least in part on the downlink grant and the determined number of transmission repetitions. The operations of 1520 may be performed according to the methods described herein. In certain examples, aspects of the operations of 1520 may be performed by a TB transmission component as described with reference to FIGS. 10 through 13.

Figure 16:
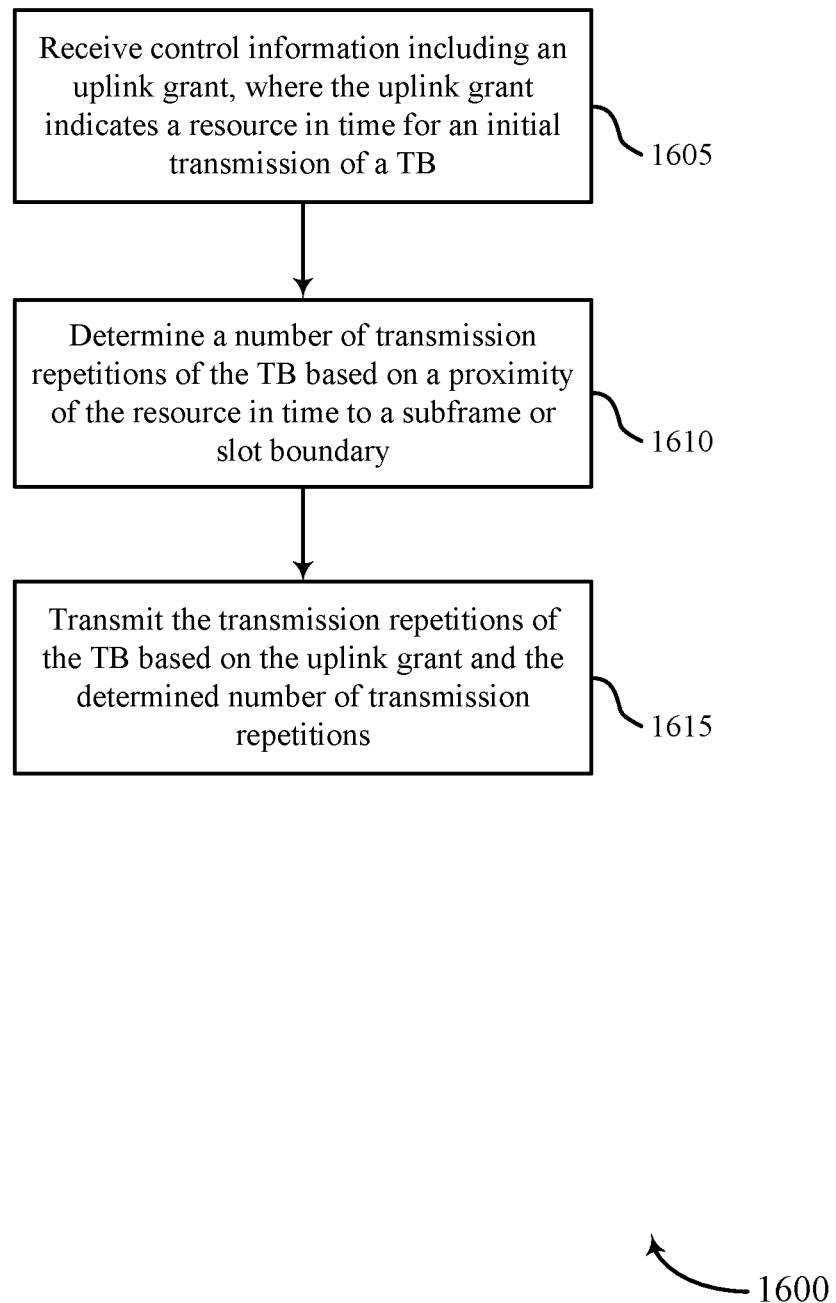

FIG. 16 shows a flowchart illustrating a method 1600 for TB repetition handling for downlink and uplink transmissions in accordance with aspects of the present disclosure. The operations of method 1600 may be implemented by a UE 115 or its components as described herein. For example, the operations of method 1600 may be performed by a UE TB repetition handling module as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may receive control information including an uplink grant, where the uplink grant indicates a resource in time for an initial transmission of a TB. In some cases, the uplink grant may be an example of an uplink SPS configuration message. The operations of 1605 may be performed according to the methods described herein. In certain examples, aspects of the operations of 1605 may be performed by a control information reception component as described with reference to FIGS. 6 through 9.

At 1610 the UE 115 may determine a number of transmission repetitions of the TB based at least in part on a proximity of the resource in time to a slot boundary or a subframe boundary. The operations of 1610 may be performed according to the methods described herein. In certain examples, aspects of the operations of 1610 may be performed by a repetition number determination component as described with reference to FIGS. 6 through 9.

At 1615 the UE 115 may transmit the transmission repetitions of the TB based at least in part on the uplink grant and the determined number of transmission repetitions. The operations of 1615 may be performed according to the methods described herein. In certain examples, aspects of the operations of 1615 may be performed by a TB transmission component as described with reference to FIGS. 6 through 9.

Figure 17:
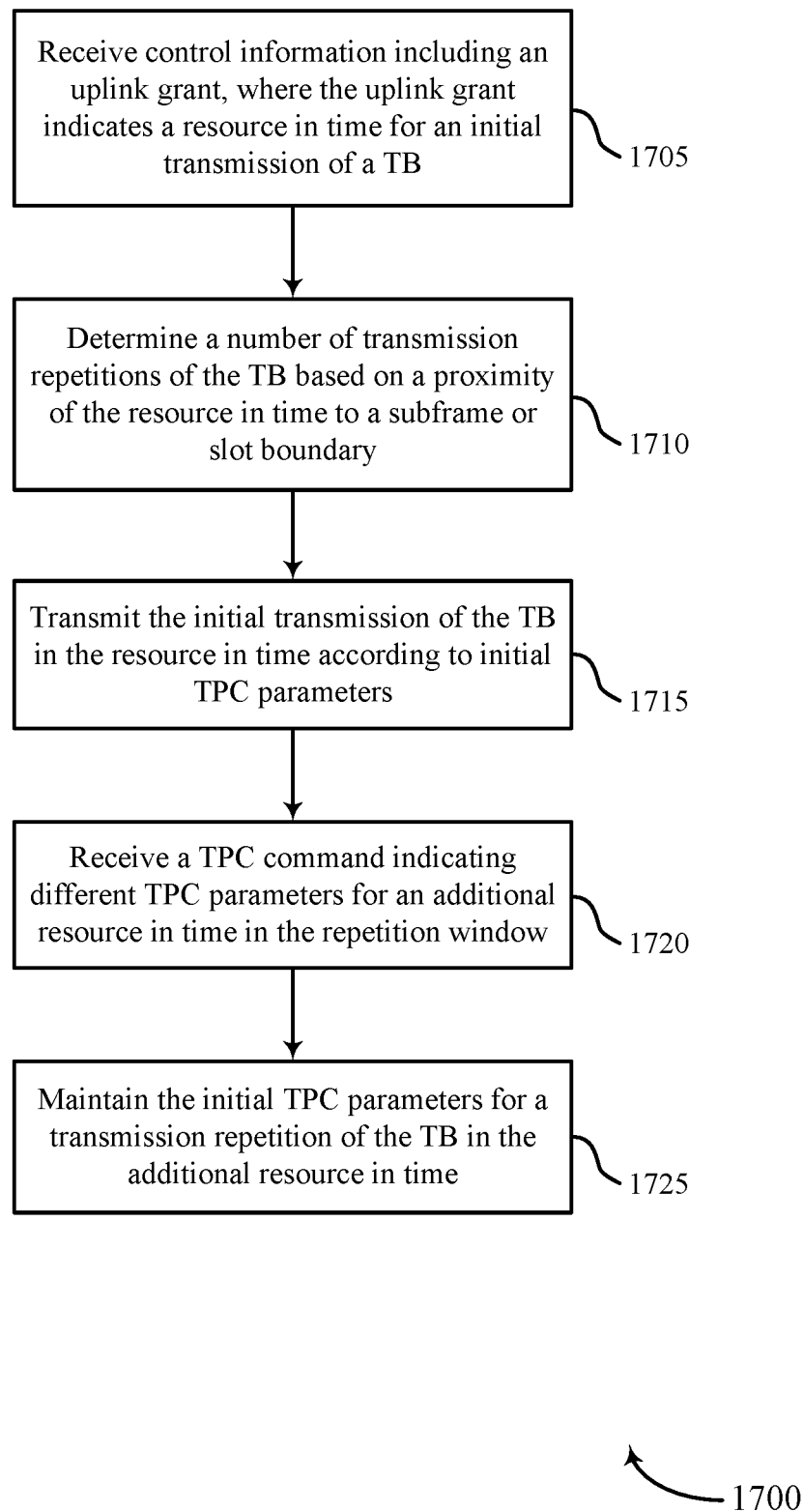

FIG. 17 shows a flowchart illustrating a method 1700 for TB repetition handling for downlink and uplink transmissions in accordance with aspects of the present disclosure. The operations of method 1700 may be implemented by a UE 115 or its components as described herein. For example, the operations of method 1700 may be performed by a UE TB repetition handling module as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may receive control information including an uplink grant, where the uplink grant indicates a resource in time for an initial transmission of a TB. The operations of 1705 may be performed according to the methods described herein. In certain examples, aspects of the operations of 1705 may be performed by a control information reception component as described with reference to FIGS. 6 through 9.

At 1710 the UE 115 may determine a number of transmission repetitions of the TB based at least in part on a proximity of the resource in time to a subframe boundary (e.g., in LTE systems) or a slot boundary (e.g., in NR systems). The operations of 1710 may be performed according to the methods described herein. In certain examples, aspects of the operations of 1710 may be performed by a repetition number determination component as described with reference to FIGS. 6 through 9.

In some cases, each TB transmission of the transmission repetitions is transmitted in a different TTI (e.g., for LTE) or mini-slot (e.g., for NR) of a repetition window. At 1715 the UE 115 may transmit the initial transmission of the TB in the resource in time (e.g., an initial TTI corresponding to a TTI index, an initial mini-slot, etc.) according to initial TPC parameters. The operations of 1715 may be performed according to the methods described herein. In certain examples, aspects of the operations of 1715 may be performed by a TPC handling component as described with reference to FIGS. 6 through 9.

At 1720 the UE 115 may receive a TPC command indicating different TPC parameters for an additional resource in time (e.g., an additional TTI or mini-slot) in the repetition window. The operations of 1720 may be performed according to the methods described herein. In certain examples, aspects of the operations of 1720 may be performed by a TPC handling component as described with reference to FIGS. 6 through 9.

At 1725 the UE 115 may maintain the initial TPC parameters for a transmission repetition of the TB in the additional resource in time (e.g., the additional TTI or mini-slot). The operations of 1725 may be performed according to the methods described herein. In certain examples, aspects of the operations of 1725 may be performed by a TPC handling component as described with reference to FIGS. 6 through 9.

Figure 18:
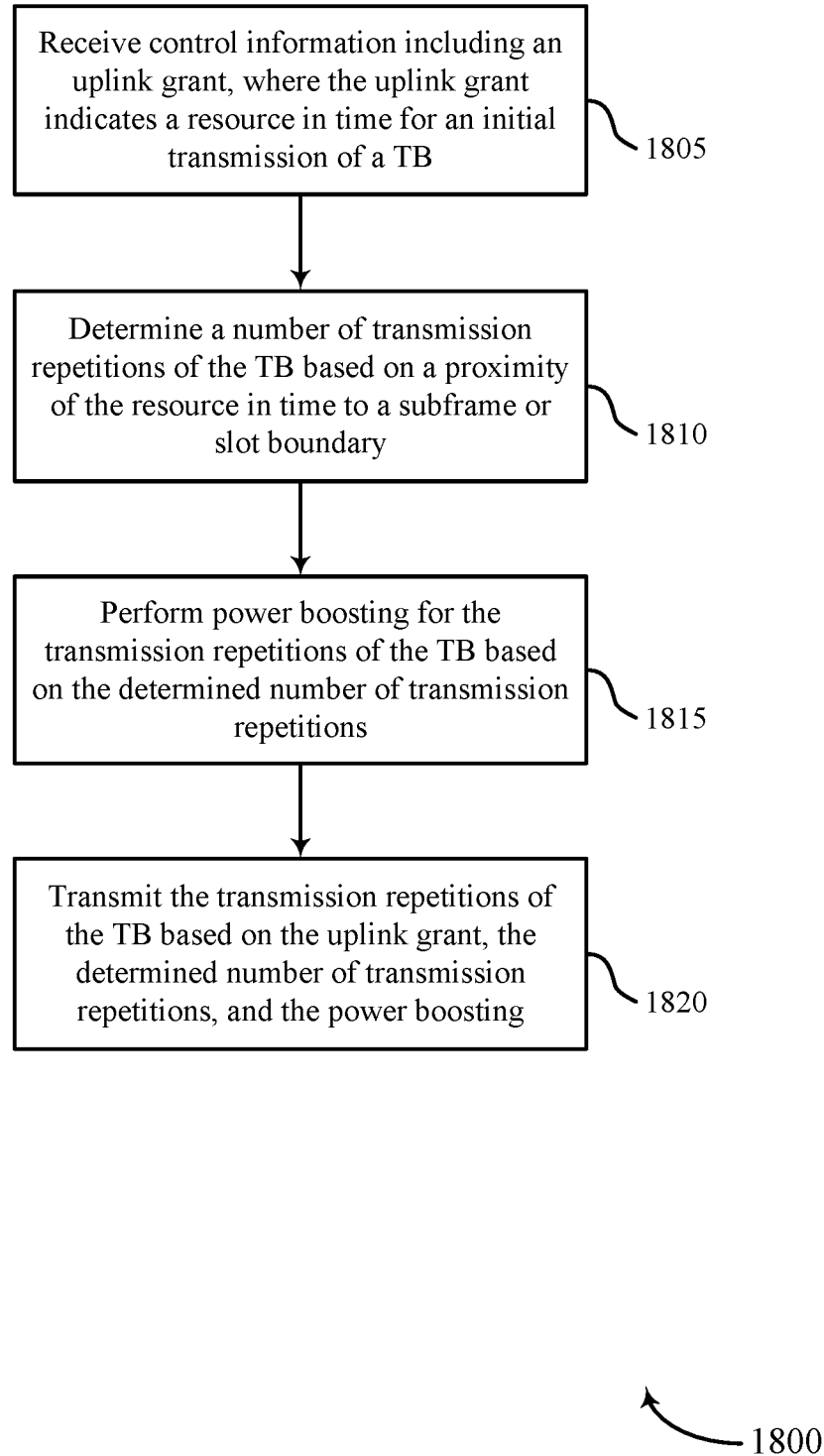

FIG. 18 shows a flowchart illustrating a method 1800 for TB repetition handling for downlink and uplink transmissions in accordance with aspects of the present disclosure. The operations of method 1800 may be implemented by a UE 115 or its components as described herein. For example, the operations of method 1800 may be performed by a UE TB repetition handling module as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1805 the UE 115 may receive control information including an uplink grant, where the uplink grant indicates a resource in time for an initial transmission of a TB. The operations of 1805 may be performed according to the methods described herein. In certain examples, aspects of the operations of 1805 may be performed by a control information reception component as described with reference to FIGS. 6 through 9.

At 1810 the UE 115 may determine a number of transmission repetitions of the TB based at least in part on a proximity of the resource in time to a subframe or slot boundary. The operations of 1810 may be performed according to the methods described herein. In certain examples, aspects of the operations of 1810 may be performed by a repetition number determination component as described with reference to FIGS. 6 through 9.

At 1815 the UE 115 may perform power boosting for the transmission repetitions of the TB based at least in part on the determined number of transmission repetitions. The operations of 1815 may be performed according to the methods described herein. In certain examples, aspects of the operations of 1815 may be performed by a power boosting component as described with reference to FIGS. 6 through 9.

At 1820 the UE 115 may transmit the transmission repetitions of the TB based at least in part on the uplink grant, the determined number of transmission repetitions, and the power boosting. The operations of 1820 may be performed according to the methods described herein. In certain examples, aspects of the operations of 1820 may be performed by a TB transmission component as described with reference to FIGS. 6 through 9.

Figure 19:
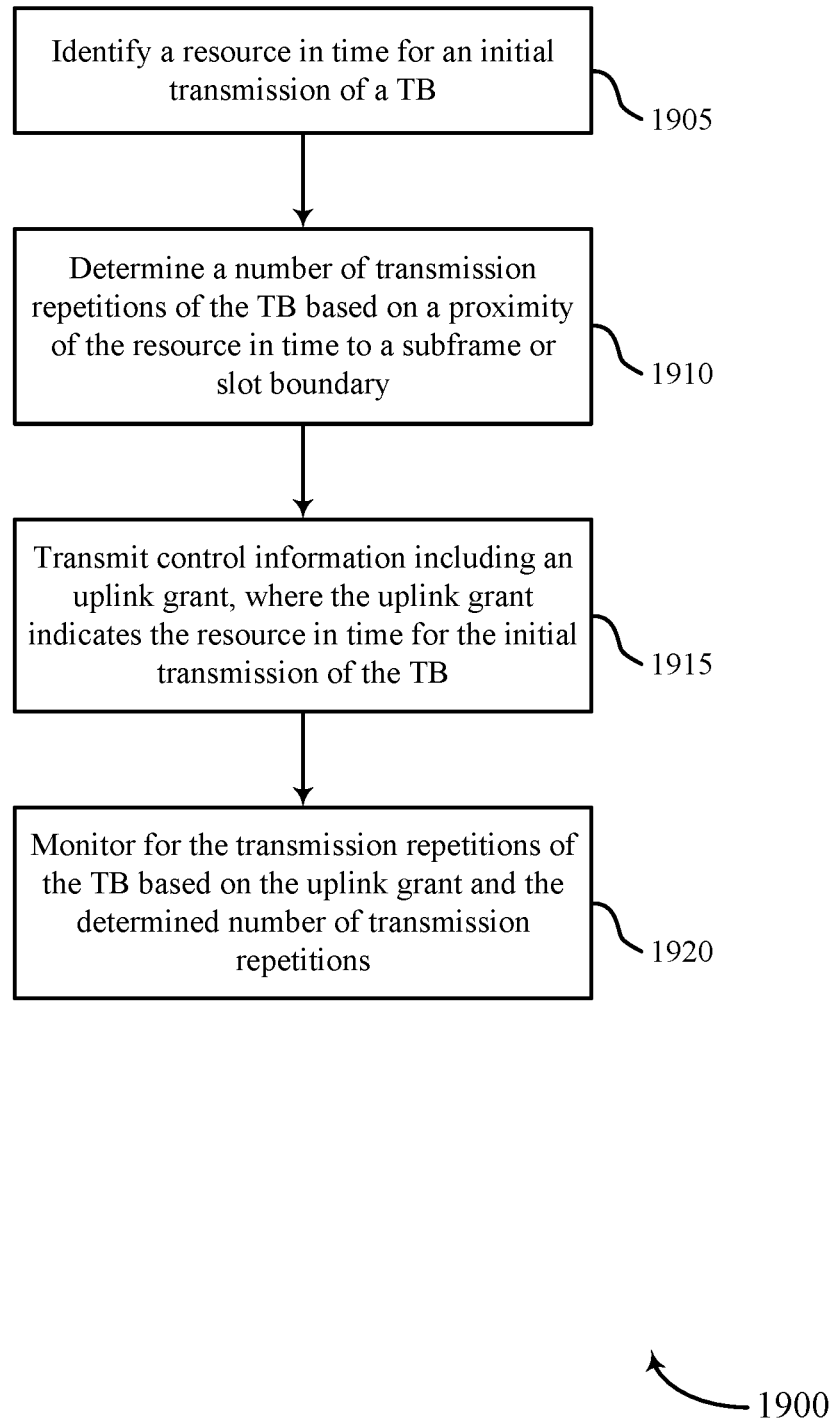

FIG. 19 shows a flowchart illustrating a method 1900 for TB repetition handling for downlink and uplink transmissions in accordance with aspects of the present disclosure. The operations of method 1900 may be implemented by a base station 105 or its components as described herein. For example, the operations of method 1900 may be performed by a base station TB repetition handling module as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1905 the base station 105 may identify a resource in time for an initial transmission of a TB. The operations of 1905 may be performed according to the methods described herein. In certain examples, aspects of the operations of 1905 may be performed by a TTI index identifier as described with reference to FIGS. 10 through 13.

At 1910 the base station 105 may determine a number of transmission repetitions of the TB based at least in part on a proximity of the resource in time to a subframe or slot boundary. The operations of 1910 may be performed according to the methods described herein. In certain examples, aspects of the operations of 1910 may be performed by a repetition number determination component as described with reference to FIGS. 10 through 13.

At 1915 the base station 105 may transmit control information including an uplink grant, where the uplink grant indicates the resource in time for the initial transmission of the TB. The operations of 1915 may be performed according to the methods described herein. In certain examples, aspects of the operations of 1915 may be performed by a control information transmission component as described with reference to FIGS. 10 through 13.

At 1920 the base station 105 may monitor for the transmission repetitions of the TB based at least in part on the uplink grant and the determined number of transmission repetitions. The operations of 1920 may be performed according to the methods described herein. In certain examples, aspects of the operations of 1920 may be performed by a TB reception component as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Described below are a number of examples of methods, systems or apparatuses including means for implementing methods or realizing apparatuses, non-transitory computer-readable medium storing instructions executable by one or more processors to cause the one or more processors to implement methods, and systems including one or more processors and memory in electronic communication with the one or more processors storing instructions executable by the one or more processors to cause the system or apparatus to implement methods. It is to be understood that these are just some examples of possible implementations, and other examples will be readily apparent to those skilled in the art without departing from the scope of the disclosure.

Example 1 is a method of wireless communications that includes receiving control information including a downlink grant, where the downlink grant indicates a resource in time for an initial transmission of a TB, determining a number of transmission repetitions of the TB based at least in part on a proximity of the resource in time to one or both of a subframe boundary and slot boundary, and monitoring for the transmission repetitions of the TB based at least in part on the downlink grant and the determined number of transmission repetitions.

In Example 2, the determining the number of transmission repetitions of the TB of Example 1 includes receiving an indication of the number of transmission repetitions of the TB in the control information.

In Example 3, the method of either of Examples 1 or 2 further includes where the number of transmission repetitions of the TB is based at least in part on a number of OFDM symbols between the resource in time and the one or both of the subframe boundary and slot boundary. In some cases of Example 3, the number of transmission repetitions of the TB is further based at least in part on a number of OFDM symbols in each TTI, mini-slot, or combination thereof.

In Example 4, the method of any of Examples 1-3 further include where the downlink grant further indicates an additional resource in time for an additional transmission of the TB based at least in part on a reliability threshold and the number of transmission repetitions, and the method of any of Examples 1-3 further includes monitoring for the additional transmission of the TB based at least in part on the downlink grant.

In Example 5, the method of Example 4 further includes where determining the number of additional transmission repetitions of the additional transmission of the TB is based at least in part on the additional resource in time, and the monitoring for the additional transmission of the TB further includes monitoring for the additional transmission repetitions of the additional transmission of the TB based at least in part on the downlink grant and the determined number of additional transmission repetitions.

In Example 6, the method of any of Examples 1-5 further include where each TB transmission of the transmission repetitions may be received in a different TTI or mini-slot of a repetition window.

Example 7 is a system or apparatus including means for implementing a method or realizing an apparatus as in any of examples 1-6.

Example 8 is a system including one or more processors and memory in electronic communication with the one or more processors storing instructions executable by the one or more processors to cause the system or apparatus to implement a method as in any of examples 1-6.

Example 9 is a non-transitory computer-readable medium storing instructions executable by one or more processors to cause the one or more processors to implement a method as in any of examples 1-6.

Example 10 is a method of wireless communications that includes identifying a resource in time for an initial transmission of a TB, determining a number of transmission repetitions of the TB based at least in part on a proximity of the resource in time to a subframe boundary, a slot boundary, or both, transmitting control information including a downlink grant, where the downlink grant indicates the resource in time for the initial transmission of the TB, and transmitting the transmission repetitions of the TB based at least in part on the downlink grant and the determined number of transmission repetitions.

In Example 11, the control information of Example 10 may further include an indication of the number of transmission repetitions of the TB.

In Example 12, the method of either of Examples 10 or 11 may include where the number of transmission repetitions of the TB is based at least in part on a number of OFDM symbols between the resource in time and the subframe boundary, the slot boundary, or both. In some cases of Example 12, the number of transmission repetitions of the TB is further based at least in part on a number of OFDM symbols in each TTI, mini-slot, or combination thereof.

In Example 13, the method of any of Examples 10-12 further include determining a desired number of transmission repetitions for the TB based at least in part on a reliability threshold and comparing the desired number of transmission repetitions for the TB to the determined number of transmission repetitions of the TB.

In Example 14, the method of Example 13 may further include determining that the desired number of transmission repetitions for the TB is greater than the determined number of transmission repetitions of the TB according to the comparing and scheduling an additional transmission of the TB in an additional resource in time based at least in part on the determining.

In Example 15, the method of any of Examples 10-14 may further include generating a packet for the TB, where the packet may be ready for transmission at the resource in time.

In Example 16, the method of any of Examples 10-15 may include where each TB transmission of the transmission repetitions may be transmitted in a different TTI or mini-slot of a repetition window.

Example 17 is a system or apparatus including means for implementing a method or realizing an apparatus as in any of examples 10-16.

Example 18 is a system including one or more processors and memory in electronic communication with the one or more processors storing instructions executable by the one or more processors to cause the system or apparatus to implement a method as in any of examples 10-16.

Example 19 is a non-transitory computer-readable medium storing instructions executable by one or more processors to cause the one or more processors to implement a method as in any of examples 10-16.

Example 20 is a method of wireless communications that includes receiving control information including an uplink grant, where the uplink grant indicates a resource in time for an initial transmission of a TB, determining a number of transmission repetitions of the TB based at least in part on a proximity of the resource in time to one or both of a subframe boundary and slot boundary, and transmitting the transmission repetitions of the TB based at least in part on the uplink grant and the determined number of transmission repetitions.

In Example 21, the method of Example 20 may further include where each TB transmission of the transmission repetitions is transmitted in a different TTI or mini-slot or both of a repetition window.

In Example 22, the method of Example 21 may further include transmitting the initial transmission of the TB in an initial TTI or mini-slot corresponding to the resource in time according to initial TPC parameters, receiving a TPC command indicating different TPC parameters for an additional TTI or mini-slot in the repetition window, and maintaining the initial TPC parameters for a transmission repetition of the TB in the additional TTI or mini-slot.

In Example 23, the method of any of Examples 20-22 may include where the number of transmission repetitions of the TB is based at least in part on a number of OFDM symbols between the resource in time and the one or both of the subframe boundary and slot boundary. In some cases of Example 23, the number of transmission repetitions of the TB is further based at least in part on a number of OFDM symbols in each TTI, mini-slot, or combination thereof.

In Example 24, the method of any of Examples 20-23 may include performing power boosting for the transmission repetitions of the TB based at least in part on the determined number of transmission repetitions.

In Example 25, the method of any of Examples 20-24 may include (e.g., when the transmission repetitions of the TB span at least two subframes, slots, or a combination thereof) transmitting at least one DMRS in each subframe of the at least two subframes, slots, or the combination thereof based at least in part on the transmission repetitions of the TB spanning the at least two subframes, slots, or the combination thereof.

In Example 26, the transmitting the transmission repetitions of the TB of Example 25 may further include transmitting a first set of transmission repetitions in a first subframe, slot, or combination thereof according to a first set of TPC parameters and transmitting a second set of transmission repetitions in a second subframe, slot, or combination thereof according to a second set of TPC parameters different from the first set of TPC parameters.

In Example 27, the method of either of Examples 25 or 26 may further include adding one or more additional transmission repetitions to the number of transmission repetitions of the TB based at least in part on a slot boundary for a second subframe of the at least two subframes, slots, or the combination thereof.

In Example 28, the method of any of Examples 25-27 may further include refraining from transmitting an SRS based at least in part on the transmission repetitions of the TB spanning the at least two subframes, slots, or the combination thereof.

In Example 29, the method of any of Examples 25-28 may further include identifying SPS TPC parameters to be applied to a second subframe, slot, or combination thereof of the at least two subframes, slots, or the combination thereof and delaying applying the SPS TPC parameters until one or more of a next repetition window, a next subframe, or a next slot based at least in part on the transmission repetitions of the TB spanning the at least two subframes, slots, or the combination thereof.

In Example 30, the method of any of Examples 20-29 may further include receiving an SPS configuration, where the number of transmission repetitions of the TB may be further based at least in part on the SPS configuration.

In Example 31, the method of any of Examples 20-30 may further include where a correlation between the number of transmission repetitions of the TB and the resource in time is RRC configured.

Example 32 is a system or apparatus including means for implementing a method or realizing an apparatus as in any of examples 20-31.

Example 33 is a system including one or more processors and memory in electronic communication with the one or more processors storing instructions executable by the one or more processors to cause the system or apparatus to implement a method as in any of examples 20-31.

Example 34 is a non-transitory computer-readable medium storing instructions executable by one or more processors to cause the one or more processors to implement a method as in any of examples 20-31.

Example 35 is a method of wireless communications that includes identifying a resource in time for an initial transmission of a TB, determining a number of transmission repetitions of the TB based at least in part on a proximity of the resource in time to one or both of a subframe boundary and slot boundary, transmitting control information including an uplink grant, where the uplink grant indicates the resource in time for the initial transmission of the TB, and monitoring for the transmission repetitions of the TB based at least in part on the uplink grant and the determined number of transmission repetitions.

In Example 36, the method of Example 35 may further include where each TB transmission of the transmission repetitions is monitored for in a different TTI or mini-slot or both of a repetition window.

In Example 37, the method of Example 36 may include receiving the initial transmission of the TB in an initial TTI or mini-slot corresponding to the resource in time according to initial TPC parameters, transmitting a TPC command indicating different TPC parameters for an additional TTI or mini-slot in the repetition window, and receiving a transmission repetition of the TB in the additional TTI or mini-slot according to the initial TPC parameters.

In Example 38, the method of any of Examples 35-37 may include where the number of transmission repetitions of the TB is based at least in part on a number of OFDM symbols between the resource in time and the one or both of the subframe boundary and slot boundary. In some cases of Example 38, the number of transmission repetitions of the TB is further based at least in part on a number of OFDM symbols in each TTI, mini-slot, or combination thereof.

In Example 39, the method of any of Examples 35-38 may further include where the transmission repetitions of the TB are power boosted based at least in part on the determined number of transmission repetitions.

In Example 40, the method of any of Examples 35-39 may further include (e.g., when the transmission repetitions of the TB span at least two subframes, slots, or a combination thereof) receiving at least one DMRS in each subframe and slot of the at least two subframes, slots, or the combination thereof based at least in part on the transmission repetitions of the TB spanning the at least two subframes, slots, or the combination thereof.

In Example 41, the monitoring for the transmission repetitions of the TB of Example 40 may further include monitoring, using a first DMRS received in a first subframe, slot, or combination thereof, for a first set of transmission repetitions in the first subframe, slot, or combination thereof associated with a first set of TPC parameters, and monitoring, using a second DMRS received in a second subframe, slot, or combination thereof, for a second set of transmission repetitions in the second subframe, slot, or combination thereof associated with a second set of TPC parameters different from the first set of TPC parameters.

In Example 42, the method of either of Examples 40 or 41 may further include adding one or more additional transmission repetitions to the number of transmission repetitions of the TB based at least in part on a slot boundary for a second subframe of the at least two subframes, slots, or combination thereof.

In Example 43, the method of any of Examples 35-42 may further include transmitting an SPS configuration, where the number of transmission repetitions of the TB is further based at least in part on the SPS configuration.

In Example 44, the method of any of Examples 35-43 may further include where a correlation between the number of transmission repetitions of the TB and the resource in time is RRC configured.

Example 45 is a system or apparatus including means for implementing a method or realizing an apparatus as in any of examples 35-44.

Example 46 is a system including one or more processors and memory in electronic communication with the one or more processors storing instructions executable by the one or more processors to cause the system or apparatus to implement a method as in any of examples 35-44.

Example 47 is a non-transitory computer-readable medium storing instructions executable by one or more processors to cause the one or more processors to implement a method as in any of examples 35-44.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications, comprising:
    receiving control information comprising an uplink grant, wherein the uplink grant indicates a resource in time for an initial transmission of a transport block (TB);
    determining, prior to the indicated resource in time, a total number of transmission repetitions of the TB based at least in part on a proximity of the resource in time to one or both of a subframe boundary and slot boundary, wherein the indicated resource in time occurs prior to the subframe boundary or slot boundary, and wherein the proximity of the resource in time indicates the total number of transmission repetitions of the TB; and
    transmitting the transmission repetitions of the TB based at least in part on the uplink grant and the determined total number of transmission repetitions, wherein the TB is transmitted at least twice in the transmission repetitions, and wherein the transmitting of the transmission repetitions of the TB are within the subframe boundary or slot boundary.

2. The method of claim 1, wherein each TB transmission of the transmission repetitions is transmitted in a different transmission time interval (TTI) or mini-slot or both of a repetition window.

3. The method of claim 2, further comprising:
    transmitting the initial transmission of the TB in an initial mini-slot corresponding to the resource in time according to initial transmit power control (TPC) parameters;
    receiving a TPC command indicating different TPC parameters for an additional mini-slot in the repetition window; and
    maintaining the initial TPC parameters for a transmission repetition of the TB in the additional mini-slot.

4. The method of claim 1, wherein the total number of transmission repetitions of the TB is based at least in part on a number of orthogonal frequency-division multiplexing (OFDM) symbols between the resource in time and the one or both of the subframe boundary and slot boundary.

5. The method of claim 4, wherein the total number of transmission repetitions of the TB is further based at least in part on a number of OFDM symbols in each transmission time interval (TTI) or mini-slot.

6. The method of claim 1, further comprising:
    performing power boosting for the transmission repetitions of the TB based at least in part on the determined total number of transmission repetitions.

7. The method of claim 1, wherein the transmission repetitions of the TB span at least two subframes or slots or both, the method further comprising:
    transmitting at least one demodulation reference signal (DMRS) in each subframe and slot of the at least two subframes or slots or both based at least in part on the transmission repetitions of the TB spanning the at least two subframes or slots or both.

8. The method of claim 7, wherein transmitting the transmission repetitions of the TB comprises:
    transmitting a first set of transmission repetitions in a first subframe or slot or both according to a first set of transmit power control (TPC) parameters; and
    transmitting a second set of transmission repetitions in a second subframe or slot or both according to a second set of TPC parameters different from the first set of TPC parameters.

9. The method of claim 7, further comprising:
    adding one or more additional transmission repetitions to the total number of transmission repetitions of the TB based at least in part on a slot boundary for a second subframe of the at least two subframes or slots or both.

10. The method of claim 7, further comprising:
    refraining from transmitting a sounding reference signal (SRS) based at least in part on the transmission repetitions of the TB spanning the at least two subframes or slots or both.

11. The method of claim 7, further comprising:
    identifying semi persistent scheduling (SPS) transmit power control (TPC) parameters to be applied to one or more of: a second subframe of the at least two subframes or a second slot of the at least two subframes or slots; and
    delaying applying the SPS TPC parameters until one or more of a next repetition window, a next subframe, or a next slot based at least in part on the transmission repetitions of the TB spanning the at least two subframes or slots or both.

12. The method of claim 1, further comprising:
    receiving a semi persistent scheduling (SPS) configuration, wherein the total number of transmission repetitions of the TB is further based at least in part on the SPS configuration.

13. The method of claim 1, wherein a correlation between the total number of transmission repetitions of the TB and the resource in time is radio resource control (RRC) configured.

14. A method for wireless communications, comprising:
    identifying a resource in time for an initial transmission of a transport block (TB);
    determining, prior to the indicated resource in time, a total number of transmission repetitions of the TB based at least in part on a proximity of the resource in time to one or both of a subframe boundary and slot boundary, wherein the indicated resource in time occurs prior to the subframe boundary or slot boundary, and wherein the proximity of the resource in time indicates the total number of transmission repetitions of the TB;
    transmitting control information comprising an uplink grant, wherein the uplink grant indicates the resource in time for the initial transmission of the TB; and
    monitoring for the transmission repetitions of the TB based at least in part on the uplink grant and the determined total number of transmission repetitions, wherein the TB is transmitted at least twice in the transmission repetitions, and wherein the transmitting of the transmission repetitions of the TB are within the subframe boundary or slot boundary.

15. The method of claim 14, wherein each TB transmission of the transmission repetitions is monitored for in a different transmission time interval (TTI) or mini-slot or both of a repetition window.

16. The method of claim 15, further comprising:
receiving the initial transmission of the TB in an initial mini-slot corresponding to the resource in time according to initial transmit power control (TPC) parameters;
transmitting a TPC command indicating different TPC parameters for an additional mini-slot in the repetition window; and
receiving a transmission repetition of the TB in the additional mini-slot according to the initial TPC parameters.

17. The method of claim 14, wherein the total number of transmission repetitions of the TB is based at least in part on a number of orthogonal frequency-division multiplexing (OFDM) symbols between the resource in time and the one or both of the subframe boundary and slot boundary.

18. The method of claim 17, wherein the total number of transmission repetitions of the TB is further based at least in part on a number of OFDM symbols in each transmission time interval (TTI) or mini-slot.

19. The method of claim 14, wherein the transmission repetitions of the TB are power boosted based at least in part on the determined total number of transmission repetitions.

20. The method of claim 14, wherein the transmission repetitions of the TB span at least two subframes or slots or both, the method further comprising:
receiving at least one demodulation reference signal (DMRS) in each subframe and slot of the at least two subframes or slots or both based at least in part on the transmission repetitions of the TB spanning the at least two subframes or slots or both.

21. The method of claim 20, wherein monitoring for the transmission repetitions of the TB comprises:
monitoring, using a first DMRS received in a first subframe or slot or both, for a first set of transmission repetitions in the first subframe or slot or both associated with a first set of transmit power control (TPC) parameters; and
monitoring, using a second DMRS received in a second subframe or slot or both, for a second set of transmission repetitions in the second subframe or slot or both associated with a second set of TPC parameters different from the first set of TPC parameters.

22. The method of claim 20, further comprising:
adding one or more additional transmission repetitions to the total number of transmission repetitions of the TB based at least in part on a slot boundary for a second subframe of the at least two subframes or slots or both.

23. The method of claim 14, further comprising:
transmitting a semi persistent scheduling (SPS) configuration, wherein the total number of transmission repetitions of the TB is further based at least in part on the SPS configuration.

24. The method of claim 14, wherein a correlation between the total number of transmission repetitions of the TB and the resource in time is radio resource control (RRC) configured.

25. An apparatus for wireless communications, comprising:
means for receiving control information comprising an uplink grant, wherein the uplink grant indicates a resource in time for an initial transmission of a transport block (TB);
means for determining, prior to the indicated resource in time, a total number of transmission repetitions of the TB based at least in part on a proximity of the resource in time to one or both of a subframe boundary and slot boundary, wherein the indicated resource in time occurs prior to the subframe boundary or slot boundary, and wherein the proximity of the resource in time indicates the total number of transmission repetitions of the TB; and
means for transmitting the transmission repetitions of the TB based at least in part on the uplink grant and the determined total number of transmission repetitions, wherein the TB is transmitted at least twice in the transmission repetitions, and wherein the transmitting of the transmission repetitions of the TB are within the subframe boundary or slot boundary.

26. An apparatus for wireless communications, comprising:
a processor;
memory in electronic communication with the processor; and
instructions stored in the memory and executable by the processor to cause the apparatus to:
receive control information comprising an uplink grant, wherein the uplink grant indicates a resource in time for an initial transmission of a transport block (TB);
determine, prior to the indicated resource in time, a total number of transmission repetitions of the TB based at least in part on a proximity of the resource in time to one or both of a subframe boundary and slot boundary, wherein the indicated resource in time occurs prior to the subframe boundary or slot boundary, and wherein the proximity of the resource in time indicates the total number of transmission repetitions of the TB; and
transmit the transmission repetitions of the TB based at least in part on the uplink grant and the determined total number of transmission repetitions, wherein the TB is transmitted at least twice in the transmission repetitions, and wherein the transmitting of the transmission repetitions of the TB are within the subframe boundary or slot boundary.

27. The apparatus of claim 26, wherein each TB transmission of the transmission repetitions is transmitted in a different transmission time interval (TTI) or mini-slot or both of a repetition window.

28. The apparatus of claim 27, wherein the instructions are further executable by the processor to cause the apparatus to:
transmit the initial transmission of the TB in an initial mini-slot corresponding to the resource in time according to initial transmit power control (TPC) parameters;
receive a TPC command indicating different TPC parameters for an additional mini-slot in the repetition window; and
maintain the initial TPC parameters for a transmission repetition of the TB in the additional mini-slot.

29. The apparatus of claim 26, wherein the total number of transmission repetitions of the TB is based at least in part on a number of orthogonal frequency-division multiplexing (OFDM) symbols between the resource in time and the one or both of the subframe boundary and slot boundary.

30. The apparatus of claim 26, wherein the instructions are further executable by the processor to cause the apparatus to:
perform power boosting for the transmission repetitions of the TB based at least in part on the determined total number of transmission repetitions.

* * * * *